(12) United States Patent
Schnell et al.

(10) Patent No.: US 12,379,065 B2
(45) Date of Patent: Aug. 5, 2025

(54) MOUNTING SYSTEMS, KITS, AND METHODS THAT PROVIDE ACCESS TO A SECONDARY DEVICE ON AN ELEVATED SUPPORT STRUCTURE

(71) Applicants: Michael Schnell, Westfield, IN (US); Michael Quigley, Zionsville, IN (US)

(72) Inventors: Michael Schnell, Westfield, IN (US); Michael Quigley, Zionsville, IN (US)

( * ) Notice: Subject to any disclaimer, the term of this patent is extended or adjusted under 35 U.S.C. 154(b) by 0 days.

(21) Appl. No.: 18/202,411

(22) Filed: May 26, 2023

(65) Prior Publication Data

US 2023/0383899 A1 Nov. 30, 2023

Related U.S. Application Data

(60) Provisional application No. 63/346,352, filed on May 27, 2022.

(51) Int. Cl.
*F16M 13/02* (2006.01)
*F16B 1/00* (2006.01)

(52) U.S. Cl.
CPC .............. *F16M 13/02* (2013.01); *F16B 1/00* (2013.01); *F16B 2200/83* (2023.08)

(58) Field of Classification Search
CPC ......... F16M 13/02; F16M 11/041; F16B 1/00; F16B 2200/83
USPC ...... 248/221.11, 224.8, 225.11, 220.21, 683, 248/206.5
See application file for complete search history.

(56) References Cited

U.S. PATENT DOCUMENTS

| | | | |
|---|---|---|---|
| 2,648,884 A * | 8/1953 | Loofboro | A44C 5/2071 24/303 |
| 5,664,298 A * | 9/1997 | Nessar-Ivanovic | A44C 5/2071 24/303 |
| 7,310,035 B2 | 12/2007 | Wooten | |
| 9,161,586 B2 | 10/2015 | Brown | |
| 9,259,916 B1 * | 2/2016 | Piatt | B41J 25/34 |
| 10,604,935 B1 | 3/2020 | Forgue | |
| 11,156,327 B2 | 10/2021 | Hillam | |
| 2009/0185370 A1 | 7/2009 | Moore | |
| 2010/0095427 A1 | 4/2010 | Romiti | |

FOREIGN PATENT DOCUMENTS

WO    WO-2016035712 A1 *   3/2016   ........... F16M 11/041

* cited by examiner

*Primary Examiner* — Kimberly T Wood
(74) *Attorney, Agent, or Firm* — MacMillan, Sobanski & Todd, LLC

(57) ABSTRACT

An example mounting system includes an anchor and a support. The anchor has an anchor main body and a first magnet. The anchor main body has a first end, a first surface, a second surface, and defines a projection. The projection extends from the first surface of the anchor main body and away from the second surface of the anchor main body. The support is releasably attachable to the anchor. The support has a support main body and a first magnet. The support main body has a first end, a first surface, a second surface, and defines a notch. The notch extends from the first surface of the support main body toward the second surface of the support main body. The projection of the anchor is disposed within the notch of the support when the support is releasably attached to the anchor.

20 Claims, 16 Drawing Sheets

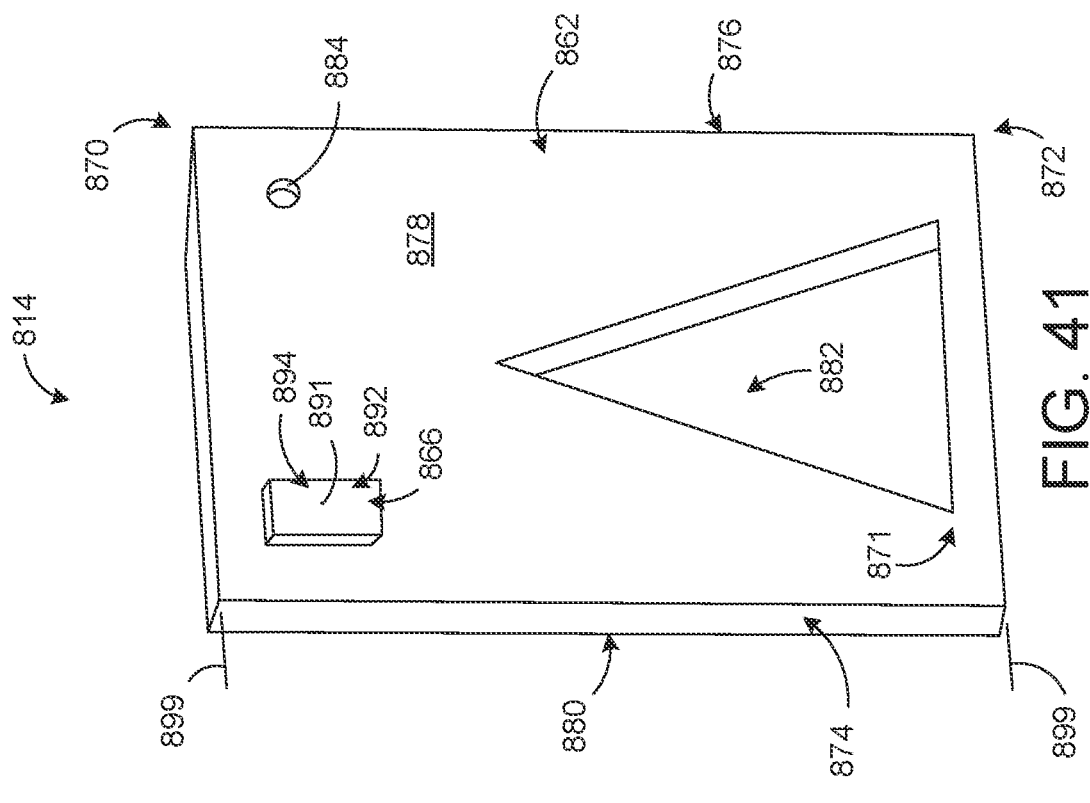
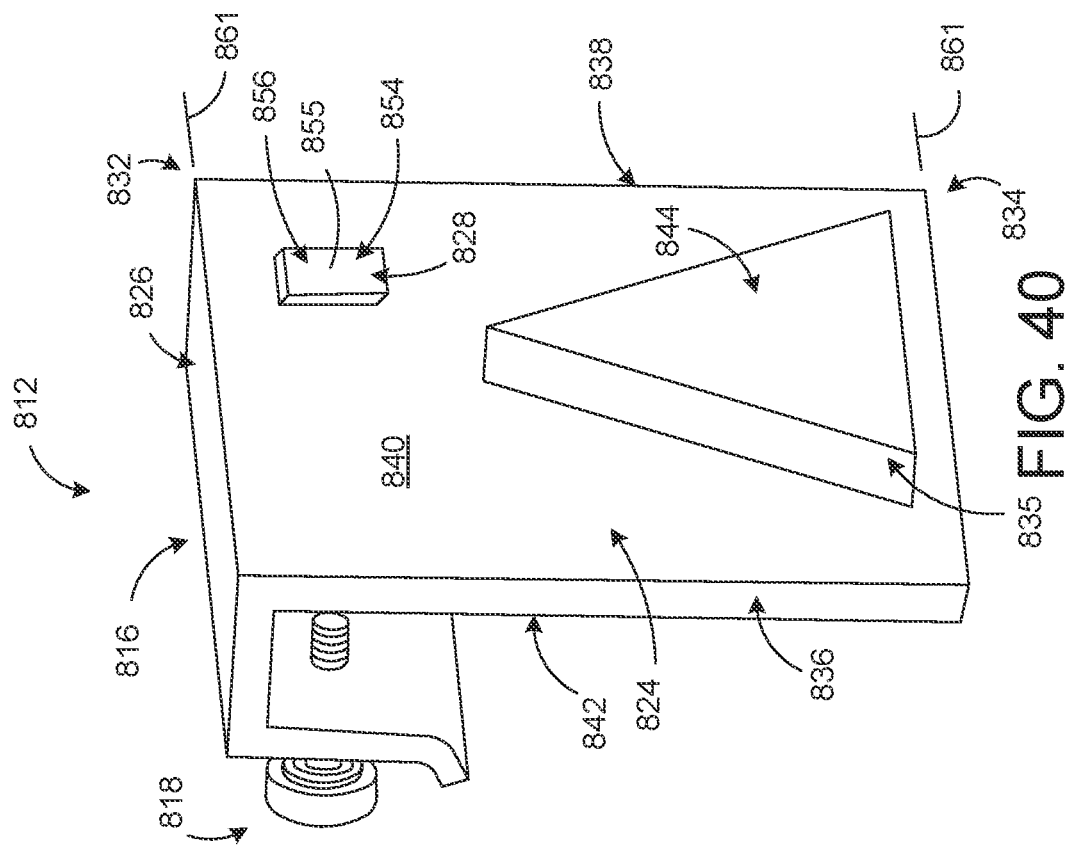

MOUNTING SYSTEMS, KITS, AND METHODS THAT PROVIDE ACCESS TO A SECONDARY DEVICE ON AN ELEVATED SUPPORT STRUCTURE

FIELD

The disclosure relates generally to the field of systems for mounting objects to a support structure. More particularly, the disclosure relates to mounting systems, kits, and methods that provide access to a secondary device on an elevated support structure.

BACKGROUND

Irrigation systems are generally utilized during dry periods to preserve landscape quality. Conventionally, these systems are programmed to operate based upon a user-defined schedule, which does not take into consideration current or recent weather conditions. As a result, over-irrigation of a landscape can occur, which can lead to an increase in diseased vegetation and water waste. Alternatively, under-irrigation of a landscape can occur, which can lead to vegetation becoming damaged or lifeless. To avoid under or over-irrigating a landscape, smart systems have been developed that include smart sensors. These sensors gather data that can be used to determine whether or not the irrigation system should operate. For example, a sensor can determine rain intensity and frequency for a particular location. If appropriate, the collected data is used to operate the irrigation system based on vegetation water needs rather than irrigating on a user-defined schedule.

However, use of these sensors has drawbacks. For example, the sensors are generally battery powered and mounted on an elevated support structure, such as the gutter of a home, to avoid any obstructions impacting the quality of the data obtained by the sensor. When it is necessary to change the sensor's battery, a maintenance specialist must individually, or with the aid of a companion, ascend to the sensor to change the battery. This is generally accomplished using a ladder or a lift. This process is dangerous and can result in injury if not completed safely. As a result, many sensor batteries go unchanged, resulting in irrigation systems running inefficiently.

This disclosure addresses the need for advanced mounting systems, kits, and methods that provide improved access to a secondary device on an elevated support structure.

SUMMARY OF SELECTED EXAMPLE EMBODIMENTS

Various example mounting system are described herein.

An example mounting system includes an anchor and a support. The anchor has an anchor main body and a first magnet. The anchor main body has a first end, a second end, a first surface, a second surface, and defines a projection. The first surface of the anchor main body is opposably facing the second surface of the anchor main body. The projection extends from the first surface of the anchor main body and away from the second surface of the anchor main body. The first magnet of the anchor is disposed between the projection and the first end of the anchor main body. The support is releasably attachable to the anchor. The support has a support main body and a first magnet. The support main body has a first end, a second end, a first surface, a second surface, and defines a notch. The first surface of the support main body is opposably facing the second surface of the support main body. The notch extends from the first surface of the support main body toward the second surface of the support main body. The first magnet of the support is disposed between the notch and first end of the support main body. The projection of the anchor is disposed within the notch of the support when the support is releasably attached to the anchor.

Additional understanding of the example mounting systems, kits, and methods described herein can be obtained by review of the detailed description, below, and the appended drawings.

BRIEF DESCRIPTION OF THE DRAWINGS

FIG. 40 is a perspective view of an alternative anchor.

FIG. 41 is a perspective view of an alternative support.

DETAILED DESCRIPTION OF SELECTED EXAMPLES

The following detailed description and the appended drawings describe and illustrate various example embodiments of mounting systems, kits, and methods that provide access to a secondary device on an elevated support structure. The description and illustration of these examples are provided to enable one skilled in the art to make and use a mounting system and kit and to practice a method of use. They are not intended to limit the scope of the claims in any manner. The invention is capable of being practiced or carried out in various ways and the examples described and illustrated herein are merely selected examples of the various ways of practicing or carrying out the invention and are not considered exhaustive.

Figure 1:
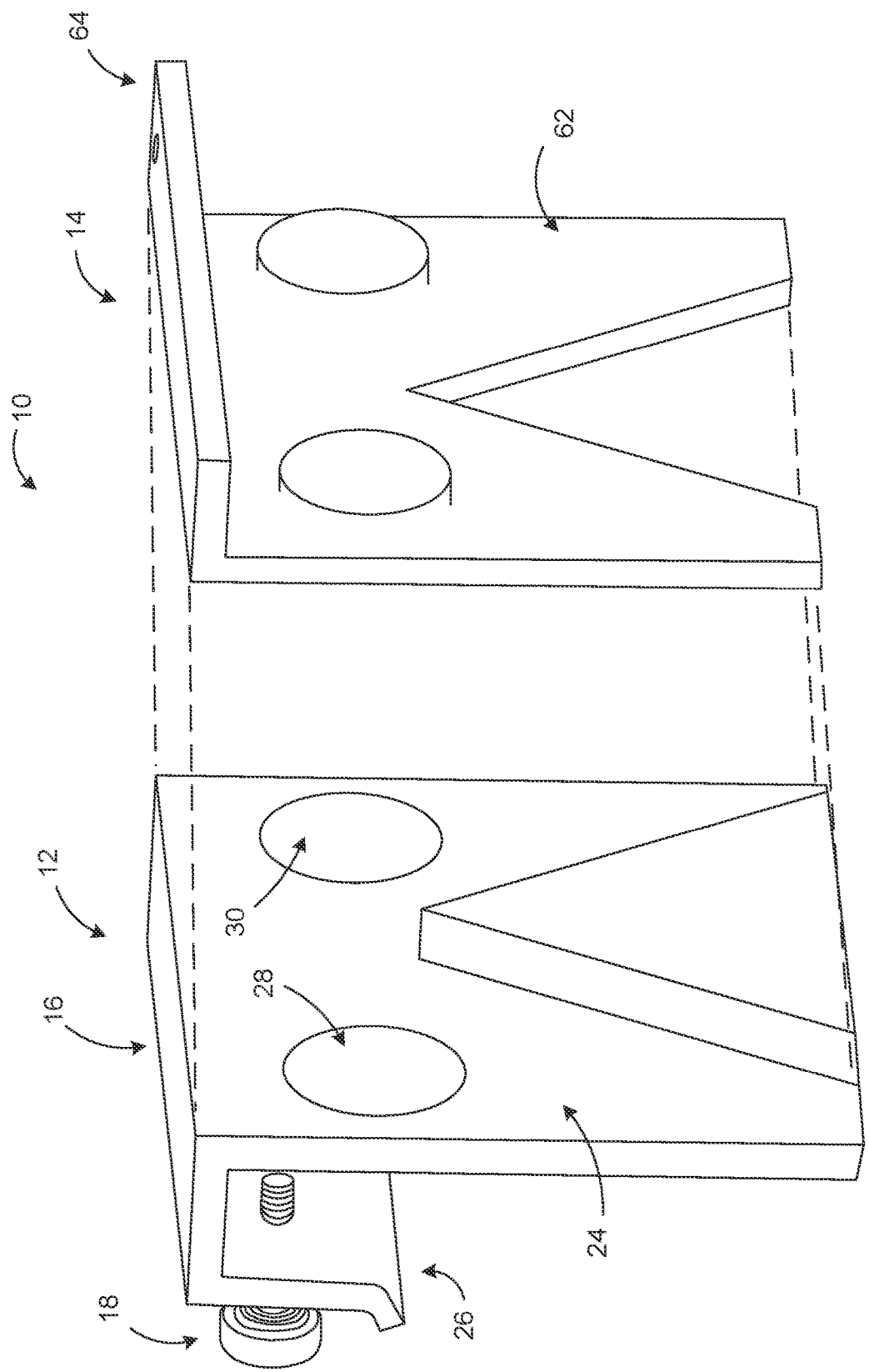
FIG. 1 is an exploded view of a first example mounting system. The mounting system includes an anchor and a support.
Figure 2:
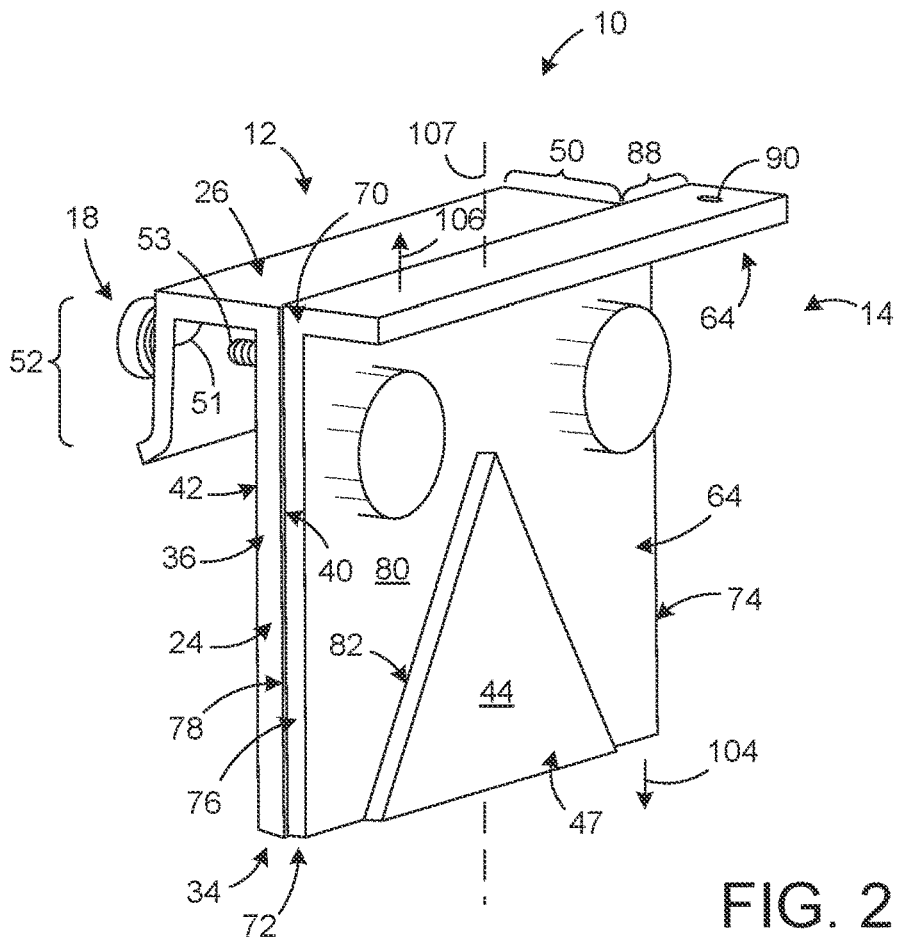
FIG. 2 is a perspective view of the mounting system illustrated in FIG. 1. The support is shown releasably attached to the anchor.
Figure 3:
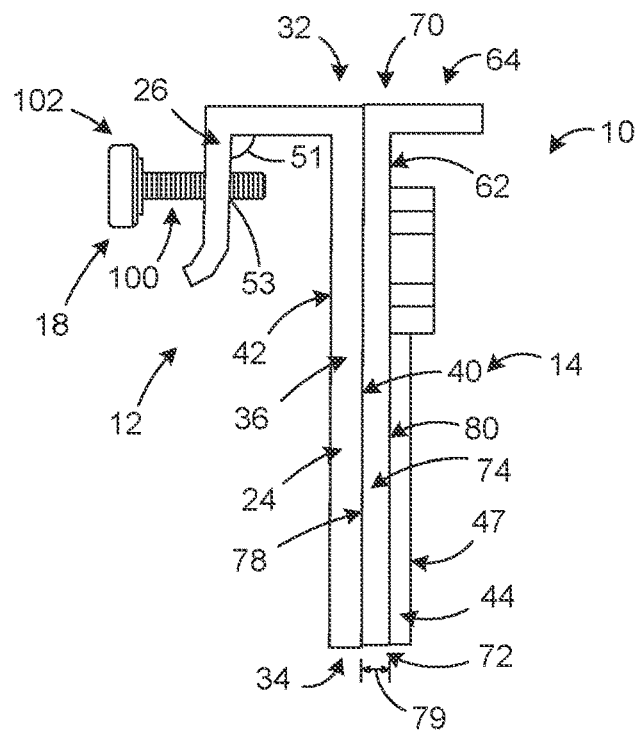
FIG. 3 is a side view of the mounting system shown in FIG. 1. The support is shown releasably attached to the anchor.
Figure 4:
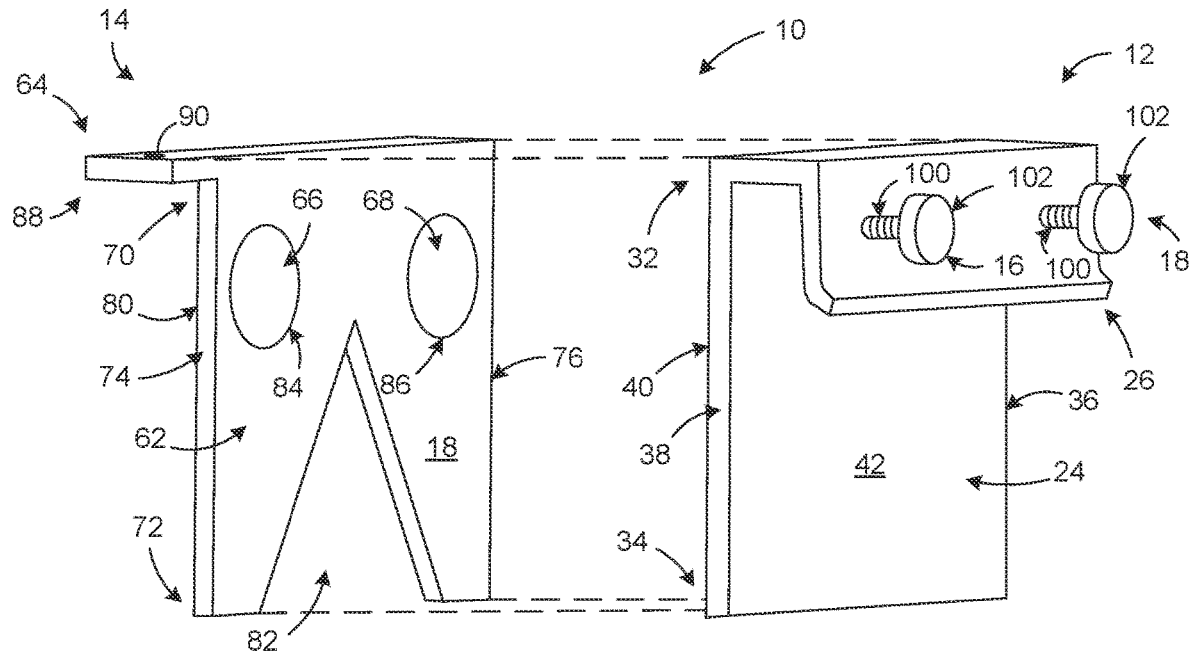
FIG. 4 is another exploded view of the mounting system illustrated in FIG. 1.
Figure 5:
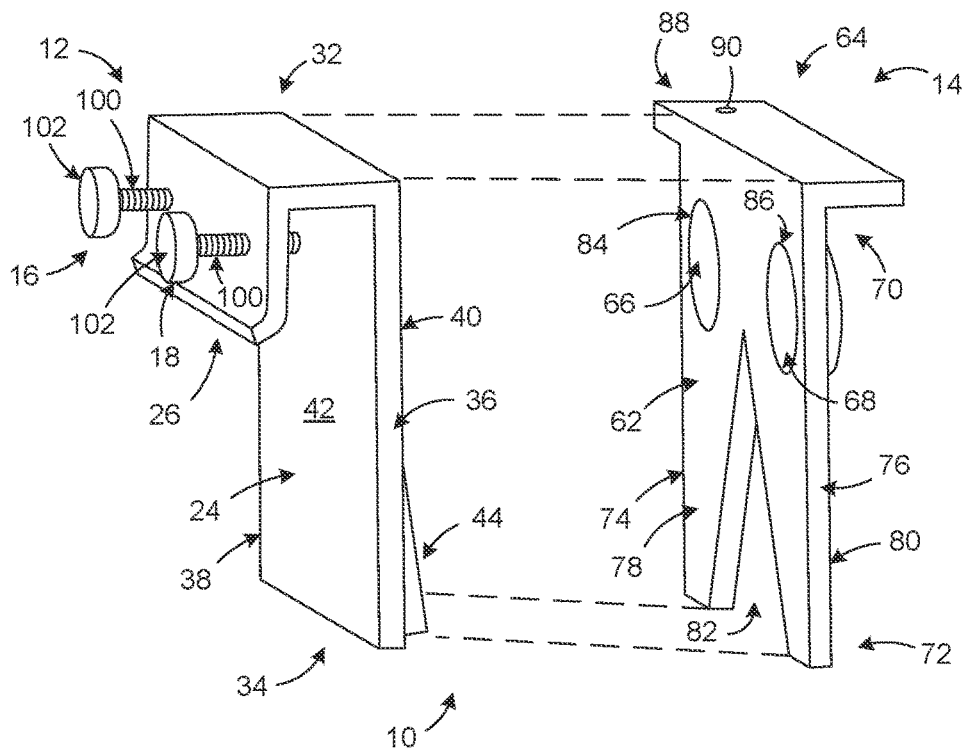
FIG. 5 is another exploded view of the mounting system illustrated in FIG. 1.
Figure 6:
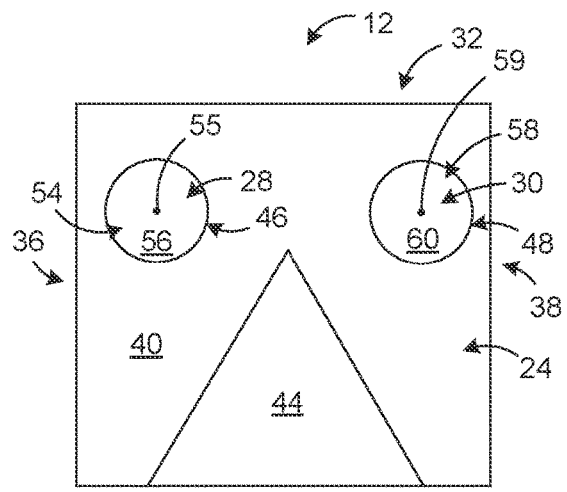
FIG. 6 is a front view of the anchor of the mounting system illustrated in FIG. 1.
Figure 7:
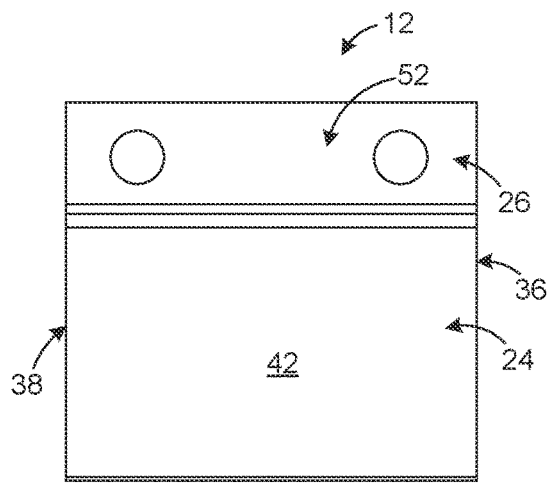
FIG. 7 is a rear view of the anchor of the mounting system illustrated in FIG. 1.
Figure 8:
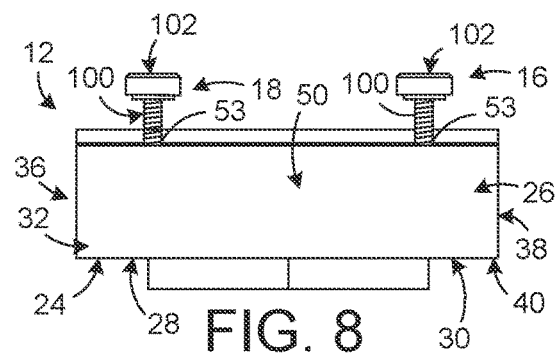
FIG. 8 is a top view of the anchor of the mounting system illustrated in FIG. 1.
Figure 9:
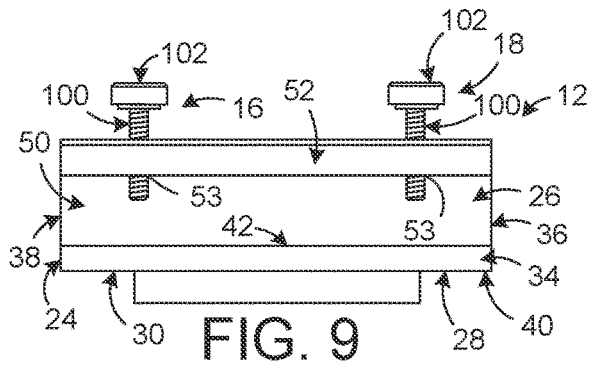
FIG. 9 is a bottom view of the anchor of the mounting system illustrated in FIG. 1.

FIGS. 1 through 17 illustrate a first example mounting system 10 that includes an anchor 12, a support 14, a first fastener 16, and a second fastener 18. The support 14 is releasably attachable to the anchor 12. FIGS. 1, 4, and 5 show the anchor 12 and support 14 separated from one another and FIGS. 2 and 3 show the support 14 releasably attached to the anchor 12. The mounting system 10 can be used to mount a secondary device, such as a sensor, to an elevated support structure, such as a gutter, and/or to provide access to a secondary device on an elevated support structure, as described herein.

As shown in FIGS. 6 through 11, the anchor 12 has an anchor main body 24, an anchor arm 26, a first magnet 28, and a second magnet 30. The anchor main body 24 has a first end 32, a second end 34, a first side 36, a second side 38, a first surface 40, a second surface 42, and defines a projection 44, a first recess 46, and a second recess 48. The first surface 40 of the anchor main body 24 extends from the first end 32 of the anchor main body 24 to the second end 34 of the anchor main body 24 and opposably faces the second surface 42 of the anchor main body 24. In the illustrated embodiment, the projection 44 extends from the first surface 40 of the anchor main body 24 and away from the second surface 42 of the anchor main body 24, extends from the second end 34 of the anchor main body 24 toward the first end 32 of the anchor main body 24, and is triangular. In the embodiment shown, the projection 44 has a thickness 45 that extends from the first surface 40 to a projection end 47. Each of the first and second recesses 46, 48 extends from the first surface 40 of the anchor main body 24 toward the second surface 42 of the anchor main body 24. While the anchor main body 24 has been illustrated as defining first and second recesses 46, 48, an anchor main body can alternatively omit the inclusion of a first recess and/or second recess such that a first magnet and/or second magnet can be attached directly (e.g., using a fastener, using adhesive) to a surface of an anchor main body (e.g., first surface, second surface). Alternatively, an anchor main body can define a through passage within which a magnet is disposed and attached (e.g., using a fastener, using adhesive) to the anchor main body.

The anchor arm 26 extends from the anchor main body 24 and has a first portion 50, a second portion 52, and defines a plurality of passageways 53. The first portion 50 extends from the second surface 42 of the anchor main body 24 and away from the first surface 40 of the anchor main body 24. The second portion 52 extends from the first portion 50 at an angle 51, which, in the embodiment shown, is equal to about 90 degrees. However, alternative embodiments can position a second portion of an anchor arm at any suitable angle relative to a first portion of the anchor arm, such as angles equal to, less than, greater than, or about 90 degrees, 45 degrees, 135 degrees, or any other angle considered suitable for a particular embodiment. In the embodiment shown, each passageway of the plurality of passageways 53 is a threaded passageway and is sized to receive a portion of a fastener (e.g., first fastener 16, second fastener 18). However, alternative embodiments can omit the inclusion of a threaded passageway on an anchor arm and other types of fasteners can be used to attach an anchor to an elevated support structure, as described herein.

Each of the first and second magnets 28, 30 of the anchor 12 is disposed between the projection 44 and the first end 32 of the anchor main body 24. However, in alternative embodiments, a magnet, or first and second magnets, included on an anchor can be disposed between a projection and a second end of an anchor main body, between a projection and a first side of an anchor main body, and/or between a projection and a second side of an anchor main body. The first magnet 28 has a main body 54 that has a first central magnet axis 55 and a first magnet surface 56. The first magnet surface 56 has a first polarity. The second magnet 30 has a main body 58 that has a second central magnet axis 59 and a second magnet surface 60. The second magnet surface 60 has a first polarity. In the embodiment shown, each of the first magnet surface 56 and the second magnet surface 60 is coplanar with the first surface 40 of the anchor main body 24. This structural arrangement, while not required, is considered advantageous at least because it allows for the support 14 to traverse the first surface 40 of the anchor main body 24 without being obstructed by any structure on the anchor 12. In the illustrated embodiment, the first magnet 28 is disposed within the first recess 46 and attached to the anchor main body 24 (e.g., using a fastener, using adhesive) and the second magnet 30 is disposed within the second recess 48 and attached to the anchor main body 24 (e.g., using a fastener, using adhesive).

Figure 10:
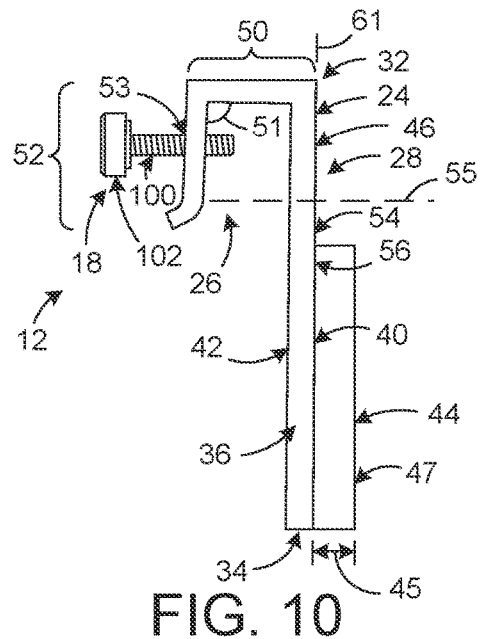
FIG. 10 is a side view of the anchor of the mounting system illustrated in FIG. 1.
Figure 11:
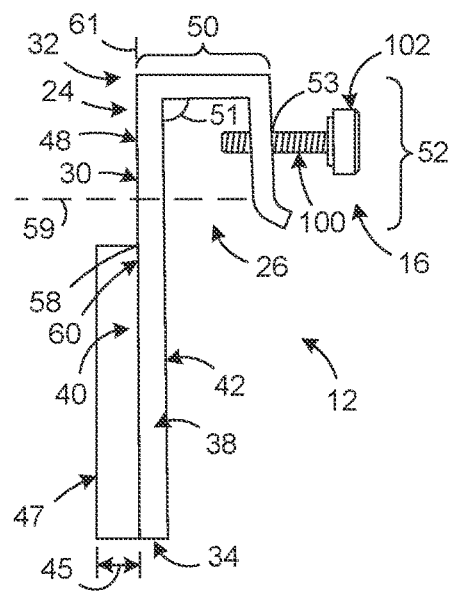
FIG. 11 is another side view of the anchor of the mounting system illustrated in FIG. 1.
Figure 12:
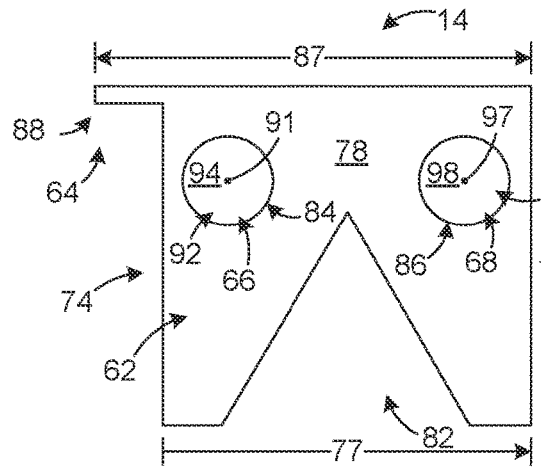
FIG. 12 is a front view of the support of the mounting system illustrated in FIG. 1.
Figure 13:
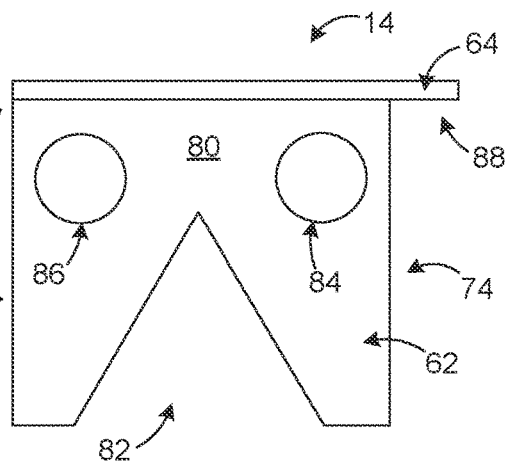
FIG. 13 is a rear view of the support of the mounting system illustrated in FIG. 1.
Figure 14:
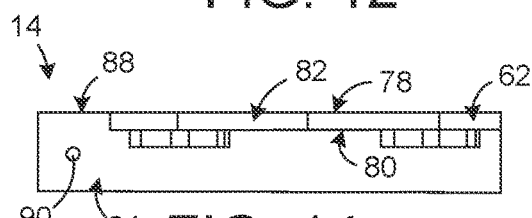
FIG. 14 is a bottom view of the support of the mounting system illustrated in FIG. 1.
Figure 15:
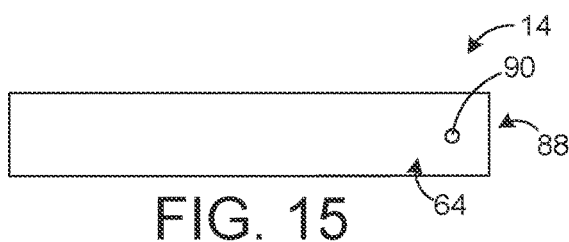
FIG. 15 is a top view of the support of the mounting system illustrated in FIG. 1.

As shown in FIGS. 10 and 11, the first central magnet axis 55 extends through the main body 54 of the first magnet 28 of the anchor 12 and the second central magnet axis 59 extends through the main body 58 of the second magnet 30 of the anchor 12. Each of the first central magnet axis 55 and the second central magnet axis 59 is disposed orthogonal to a hypothetical plane 61 that contains a portion, or the entirety, of the first surface 40 of the anchor main body 24. In the embodiment shown, the first central magnet axis 55 and the second central magnet axis 59 are parallel to one another. While the first and second magnets 28, 30 have been illustrated as being positioned within respective recesses 46, 48 and at particular angles relative to one another, a magnet can be positioned at any suitable location, and at any suitable angle, on an anchor main body that allows for the magnetic properties of the magnet to accomplish releasable attachment between an anchor and a support, as described herein.

As shown in FIGS. 12 through 17, the support 14 has a support main body 62, a support arm 64, a first magnet 66, and a second magnet 68. The support main body 62 has a first end 70, a second end 72, a first side 74, a second side 76, a width 77, a thickness 79, a first surface 78, a second surface 80, and defines a notch 82, a first recess 84, and a second recess 86. The width 77 of the support main body 62 extends from the first side 74 to the second side 76. The thickness 79 of the support main body 62 extends from the first surface 78 to the second surface 80 and is less than the thickness 45 of the projection 44. However, alternative embodiments can include a support main body that has a thickness that is equal to, greater than, or less than, a thickness of a projection. The first surface 78 of the support main body 62 extends from the first end 70 of the support main body 62 to the second end 72 of the support main body 62 and opposably faces the second surface 80 of the support main body 62.

In the illustrated embodiment, the notch 82 extends from the first surface 78 of the support main body 62 to the second surface 80 of the support main body 62, extends from the second end 72 of the support main body 62 toward the first end 70 of the support main body 62, and is triangular. In the embodiment shown, the notch 82 is sized and configured to mate with the projection 44 of the anchor 12. Each of the first and second recesses 84, 86 extends from the first surface 78 of the support main body 62 toward the second surface 80 of the support main body 62. While the support main body 62 has been illustrated as defining first and second recesses 84, 86, a support main body can alternatively omit the inclusion of a first recess and/or second recess such that a first magnet and/or second magnet can be attached directly (e.g., using a fastener, using adhesive) to a surface of a support main body (e.g., first surface, second surface). Alternatively, a support main body can define a through passage within which a magnet is disposed and attached to the support main body (e.g., using a fastener, using adhesive).

The support arm 64 extends from the second surface 80 of the support main body 62 and away from the first surface 78 of the support main body 62. The support arm 64 has a width 87 and defines a wing 88 and a passageway 90. The width 87 of the support arm 64 is greater than the width 77 of the support main body 62 such that the support arm 64 defines the wing 88. The wing 88 extends from the support arm 64 and away from the second side 76 of the support main body 62. However, alternative embodiments can omit the inclusion of a wing or include a wing that extends in any suitable direction relative to a support main body or a side of a support main body. The passageway 90 extends through the thickness of the wing 88 and is sized to receive a fastener to releasably attach a secondary device, such as a sensor, to the support 14.

Each of the first and second magnets 66, 68 of the support 14 is disposed between the notch 82 and first end 70 of the support main body 62. However, in alternative embodiments, a magnet, or first and second magnets, included on a support can be disposed between a notch and a second end of a support main body, between a notch and a first side of a support main body, and/or between a notch and a second side of a support main body. The first magnet 66 has a main body 92 that has a first central magnet axis 91 and a first magnet surface 94. The first magnet surface 94 has a second polarity that is different than the first polarity of the second magnet surface of the second magnet 30 of the anchor 12 such that the first magnet 66 of the support 14 is magnetically attracted to the second magnet 30 of the anchor 12. The second magnet 68 has a main body 96 that has a second central magnet axis 97 and a second magnet surface 98. The second magnet surface 98 has a second polarity that is different than the first polarity of the first magnet surface 56 of the first magnet 28 of the anchor 12 such that the second magnet 68 of the support 14 is magnetically attracted to the first magnet 28 of the anchor 12. In the embodiment shown, each of the first magnet surface 94 and the second magnet surface 98 is coplanar with the first surface 78 of the support main body 62. This structural arrangement, while not required, is considered advantageous at least because it allows for the support 14 to traverse the first surface of the anchor main body 24 without being obstructed by any structure of the support 14. In the illustrated embodiment, the first magnet 66 is disposed within the first recess 84 and attached to the support main body 62 (e.g., using a fastener, using adhesive) and the second magnet 68 is disposed within the second recess 86 and attached to the support main body 62 (e.g., using a fastener, using adhesive).

Figure 16:
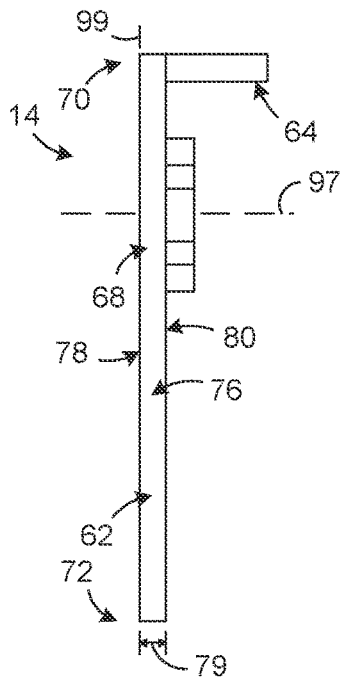
FIG. 16 is a side view of the support of the mounting system illustrated in FIG. 1.
Figure 17:
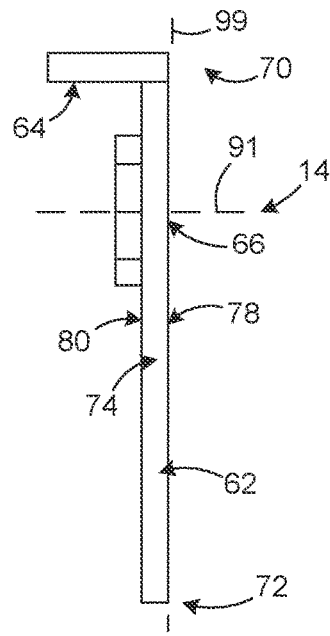
FIG. 17 is another side view of the support of the mounting system illustrated in FIG. 1.

As shown in FIGS. 16 and 17, the first central magnet axis 91 extends through the main body 92 of the first magnet 66 of the support 14. The second central magnet axis 97 extends through the main body 96 of the second magnet 68 of the support 14. Each of the first central magnet axis 91 and the second central magnet axis 97 is disposed orthogonal to a hypothetical plane 99 that contains a portion, or the entirety, of the first surface 78 of the support main body 62. In the embodiment shown, the first central magnet axis 91 and the second central magnet axis 97 are parallel to one another. While the first and second magnets 66, 68 have been illustrated as being positioned within respective recesses 84, 86 and at particular angles relative to one another, a magnet can be positioned at any suitable location, and at any suitable angle, on a support main body that allows for the magnetic properties of the magnet to accomplish releasable attachment between an anchor and a support, as described herein.

When the support 14 is releasably attached to the anchor 12, the first central magnet axis of the first magnet 28 of the anchor 12 is coaxial with the second central magnet axis 97 of the second magnet 68 of the support 14 and the second central magnet axis 59 of the second magnet of the anchor 12 is coaxial with the first central magnet axis 91 of the first magnet 66 of the support 14. However, alternative embodiments can include corresponding first magnets and/or corresponding second magnets that have axes that are not coaxial with one another.

While the anchor 12 has been illustrated as including first and second magnets 28, 30 and the support 14 has been illustrated as including first and second magnets 66, 68, an anchor and a support can include any suitable number and type of magnets having any suitable structural arrangement. Selection of a suitable number of magnets and of a suitable type of magnet to include on an anchor and/or a support can be based on various considerations, including the material that forms an anchor and/or support. Examples of numbers of magnets considered suitable to include on an anchor and/or support include one, at least one, two, a plurality, three, four, five, more than five, and any other number considered suitable for a particular embodiment. Examples of shapes of magnets considered suitable to include on an anchor and/or support include bar magnets, circular magnets, ring magnets, and any other geometric shape considered suitable for a particular embodiment. Examples of types of magnets considered suitable to include on an anchor and/or support include permanent magnets, such as ferrite magnets, neodymiumiron boron magnets, samarium cobalt magnets, alnico magnets, ceramic magnets, and any other magnet considered suitable for a particular embodiment.

Each of the first and second fasteners 16, 18 has a threaded elongate member 100 and a knob 102 attached to the threaded elongate member 100. The threaded elongate member 100 is sized to be received by a passageway of the plurality of passageways 53 defined by the anchor arm 26 of the anchor 12. While particular fasteners 16, 18 have been illustrated, any suitable type of fastener can be included in a mounting system and selection of a suitable fastener can be based on various considerations, such as the intended use of the mounting system. Examples of fasteners considered suitable to include in a mounting system include threaded fasteners, clips, spring actuated fasteners, and any other fastener capable of providing releasable and/or fixed attachment between an anchor and an elevated support structure.

A method of attaching an anchor to an elevated support structure will now be described. To accomplish releasable attachment between an anchor and an elevated support structure, such as a gutter, a force is applied to the anchor 12 in any suitable direction until the anchor 12 is passed over a portion of the elevated support structure and the portion of the elevated support structure is disposed between the second portion 52 of the anchor arm 26 and the anchor main body 24. Subsequently, a force is applied to the first and second fasteners 16, 18 until the anchor 12 is releasably attached to the elevated support structure. In the embodiment shown, this is accomplished by applying torque to the knob 102 of the first fastener 16 and to the knob 102 of the second fastener 18 until the anchor 12 is releasably attached to the elevated support structure.

A method of attaching a support to an anchor will now be described. To accomplish releasable attachment between an anchor 12 and a support 14, the support 14 is positioned such that the first surface 78 of the support main body 62 is directed toward the first surface 40 of the anchor main body 24. In addition, the support 14 is rotated such that the second end 72 of the support main body 62 is oriented in the same direction as the second end 34 of the anchor main body 24. An axial force is then applied to the support 14 directed toward the first end 70 of the support main body 62 until the first end 70 of the support 14 is elevated relative to the first end 32 of the anchor 12. An axial force directed toward the anchor 12 is then applied to the support 14 until the first surface 78 of the support main body 62 contacts the first surface 40 of the anchor main body 24. An axial force is then applied to the support 14 directed toward the second end 72 of the support main body 62 until the projection 44 is disposed within the notch 82, the first magnet 28 of the anchor 12 is magnetically attracted to the second magnet 68 of the support 14, and the second magnet 30 of the anchor 12 is magnetically attracted to the first magnet 66 of the support 14. As shown in FIGS. 2 and 3, when the support 14 is releasably attached to the anchor 12 the projection 44 is disposed within the notch 82, the projection 44 contacts the support 14, and the first surface 40 of the anchor main body 24 contacts the first surface 78 of the support main body 62. However, alternative embodiments can include an anchor or support that has any suitable configuration, such as those in which any suitable number of features and/or surfaces of an anchor contact any suitable number of features and/or surfaces of a support when the support is releasably attached to the anchor.

As shown in FIG. 2, when the support 14 is releasably attached to the anchor 12, the projection 44 prevents axial movement of the support 14 in a first direction, shown by arrow 104, and allows axial movement of the support 14 in a second direction, shown by arrow 106. The second direction 106 is opposite the first direction 104. The first direction 104 and the second direction 106 are disposed parallel to an axis 107 that extends through the first end 70 and the second end 72 of the support main body 62.

A method of providing access to a secondary device (e.g., sensor attached to support 14 (e.g., support arm 64, wing 88)) on an elevated support structure will now be described. To accomplish access to a secondary device attached to a support 14, which is releasably attached to an anchor 12, an axial force is applied to the support 14 directed away from the second end 72 of the support main body 62 until the projection 44 becomes free of the notch 82. An axial force directed away from the anchor 12 is then applied to the support 14 until the first surface 78 of the support main body 62 is free of contact with the first surface 40 of the anchor main body 24. An axial force is then applied to the support 14 directed away from the first end 70 of the support main body 62 until support 14 and the secondary device become accessible to a user.

Any suitable secondary device can be attached to a support 14 (e.g., wing 88 using passageway 90 and/or a fastener) and selection of a suitable secondary device can be based on various considerations, such as the intended use of the mounting system 10. Examples of secondary devices considered suitable to attach (e.g., releasably, fixedly) to a support include weather sensors, rain sensors, wind sensors, light sensors, lights, light strands, outdoor lighting, and any other secondary device considered suitable for a particular embodiment.

While the anchor 12 and the support 14 have been illustrated as having particular structural arrangements, an anchor and a support can be formed of any suitable material and have any suitable structural arrangement capable of providing the functions described herein. Selection of a suitable structural arrangement for an anchor and/or support and of a material to form an anchor and/or support can be based on various considerations, such as the type of elevated support structure to which a mounting system is intended to be attached. For example, an anchor can omit an anchor arm and define other structure to accomplish attachment to an elevated support structure and/or a support can omit the inclusion of a support arm and define other structure to accomplish attachment of a secondary device. Furthermore, an anchor and/or support can include any suitable number of recesses sized to receive a magnet. Alternatively, a magnet can be directly attached (e.g., using a fastener, adhesive) to a surface of an anchor and/or support (e.g., first surface, second surface). Examples of materials considered suitable to form an anchor and/or a support include metals, plastics, polymers, and any other material considered suitable for a particular embodiment.

FIGS. 18 through 34 illustrate a second example mounting system 210 that includes an anchor 212 and a support 214. The mounting system 210 is similar to the mounting system 10 illustrated in FIGS. 1 through 17 and described above, except as detailed below.

Figure 18:
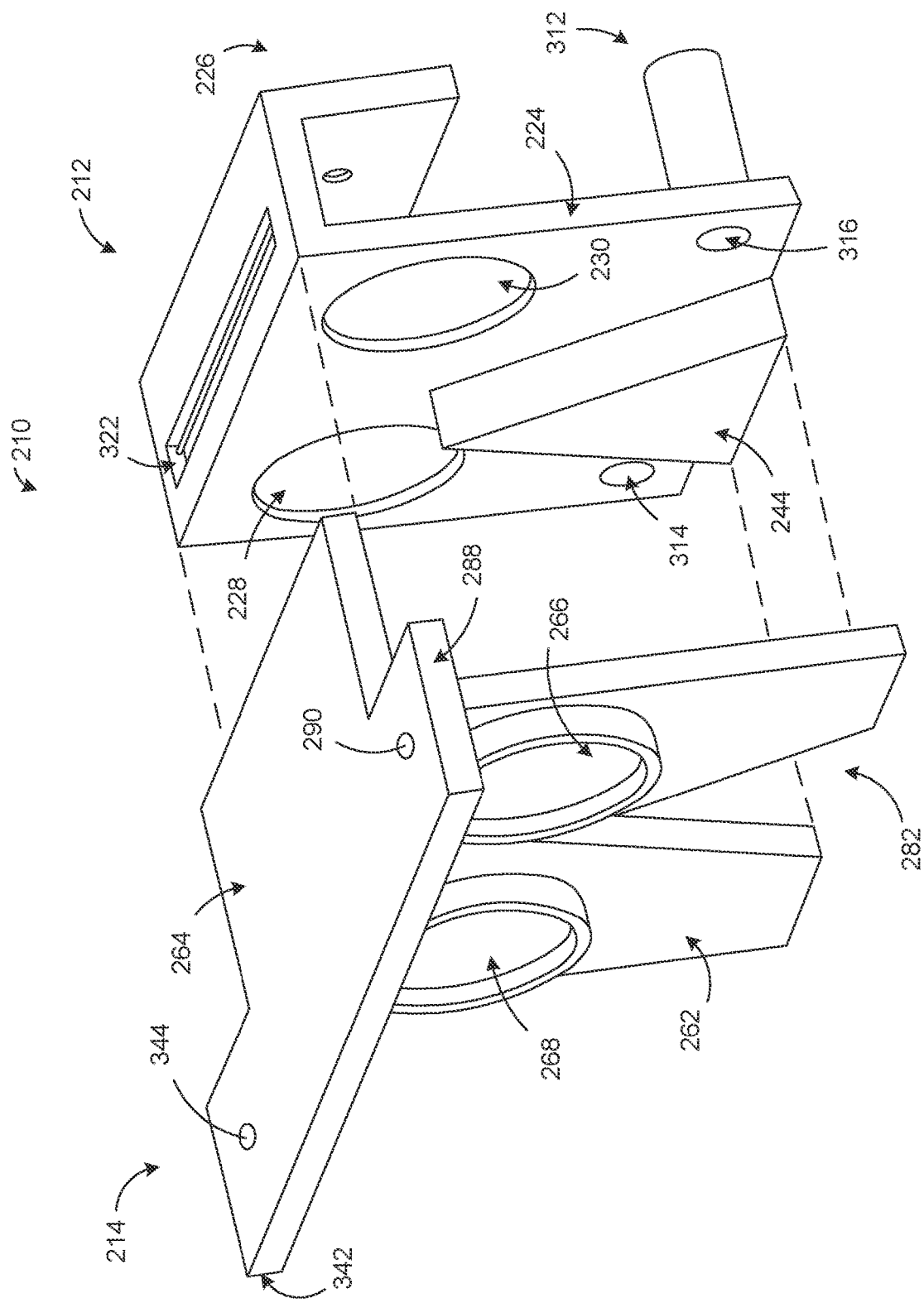
FIG. 18 is an exploded view of a second example mounting system. The mounting system includes an anchor and a support.
Figure 19:
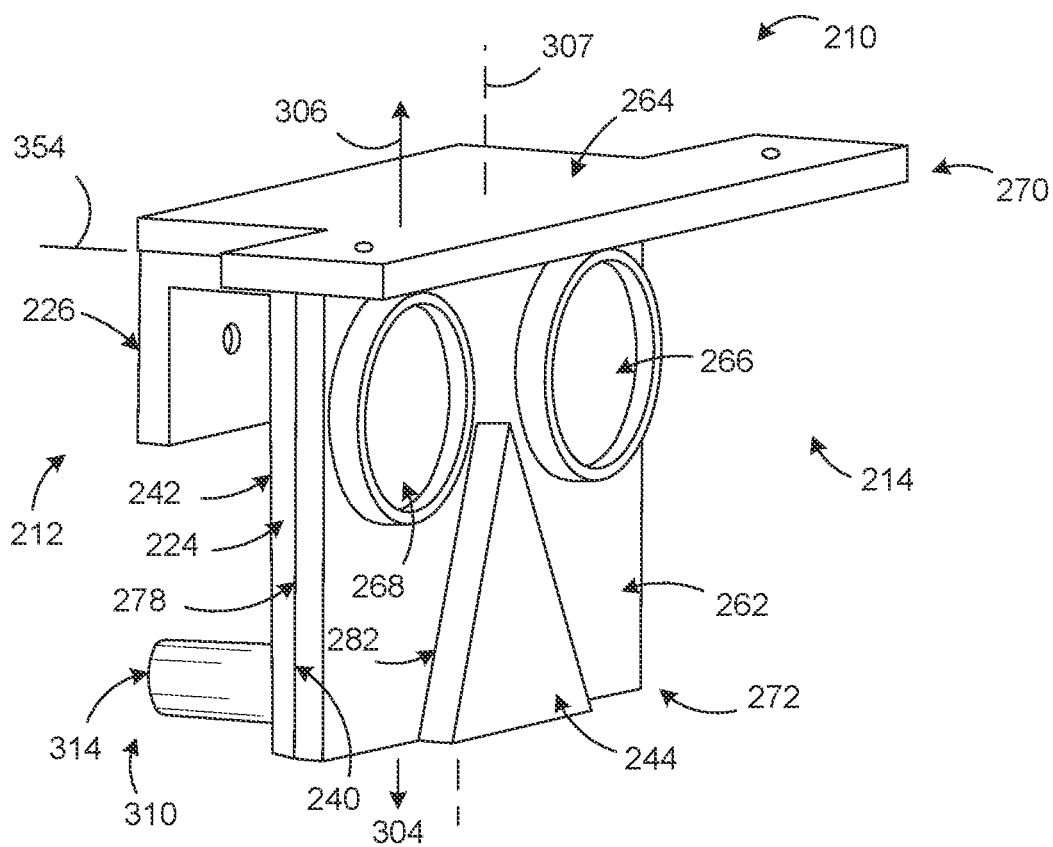
FIG. 19 is a perspective view of the mounting system illustrated in FIG. 18. The support is shown releasably attached to the anchor.
Figure 20:
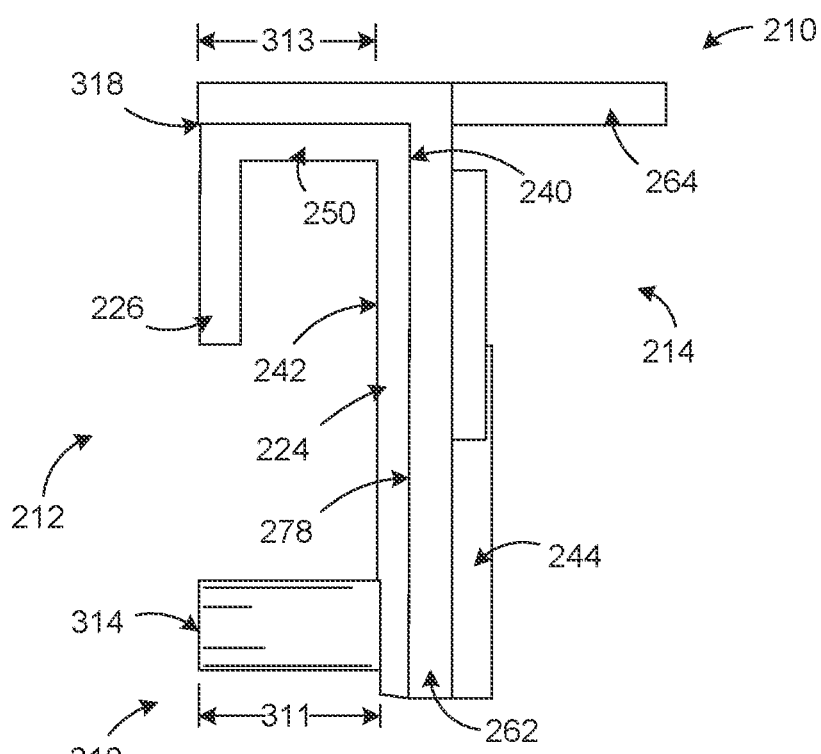
FIG. 20 is a side view of the mounting system shown in FIG. 18. The support is shown releasably attached to the anchor.
Figure 21:
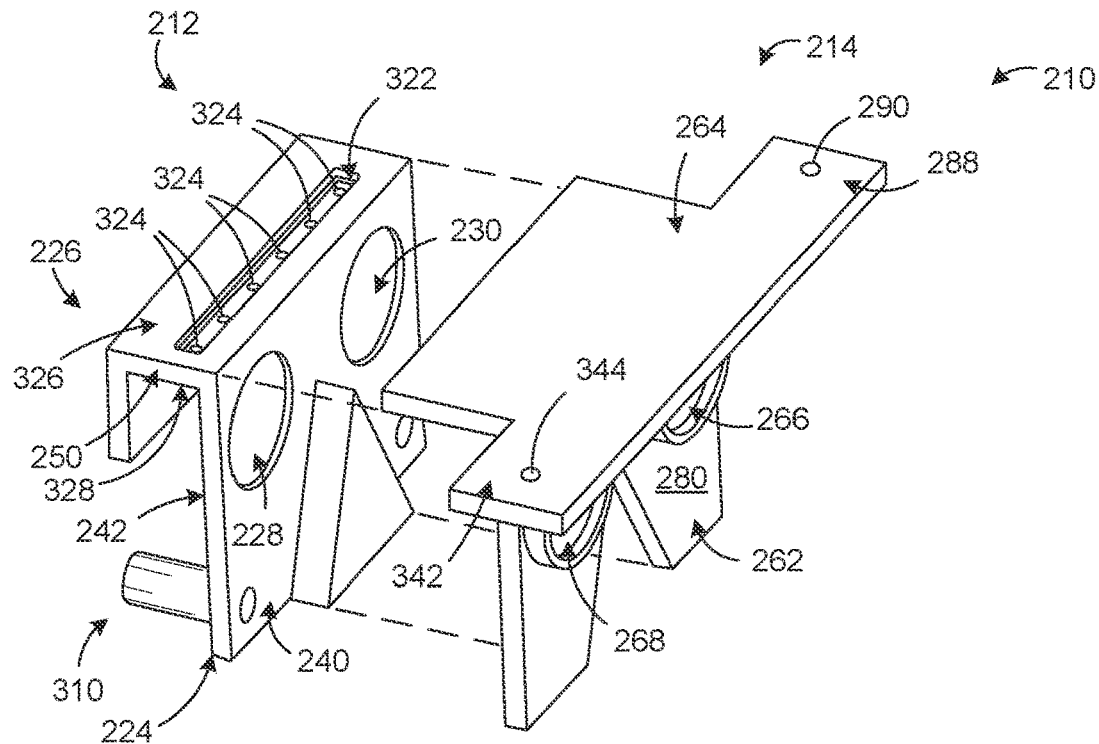
FIG. 21 is another exploded view of the mounting system illustrated in FIG. 18.
Figure 22:
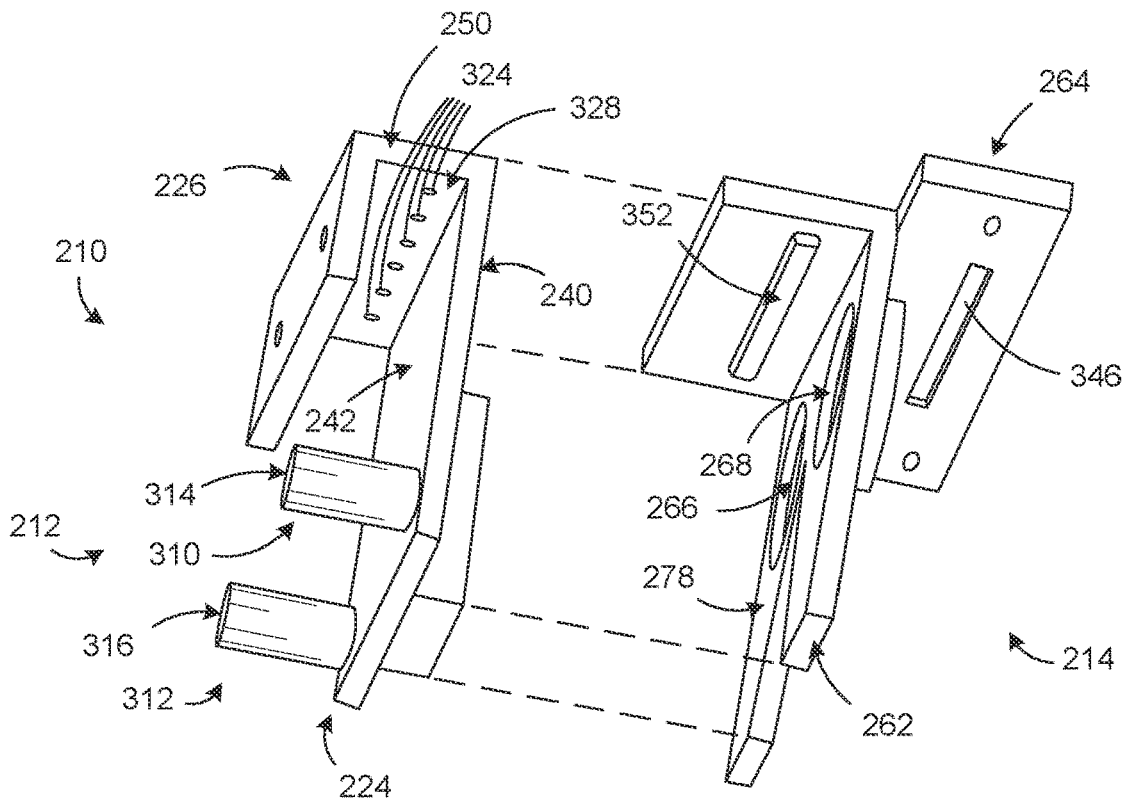
FIG. 22 is another exploded view of the mounting system illustrated in FIG. 18.
Figure 23:
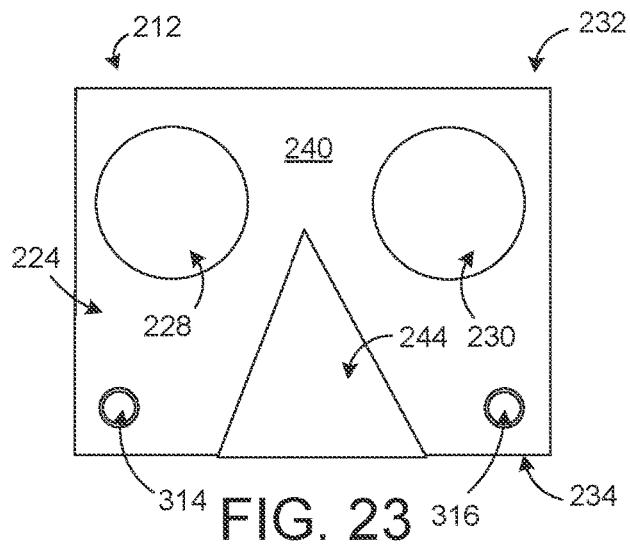
FIG. 23 is a front view of the anchor of the mounting system illustrated in FIG. 18.
Figure 24:
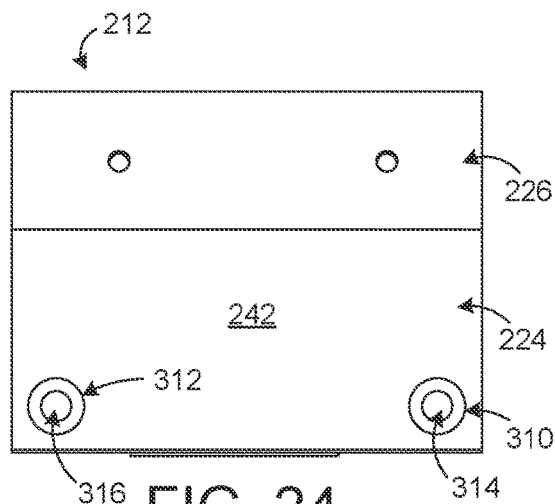
FIG. 24 is a rear view of the anchor of the mounting system illustrated in FIG. 18.
Figure 25:
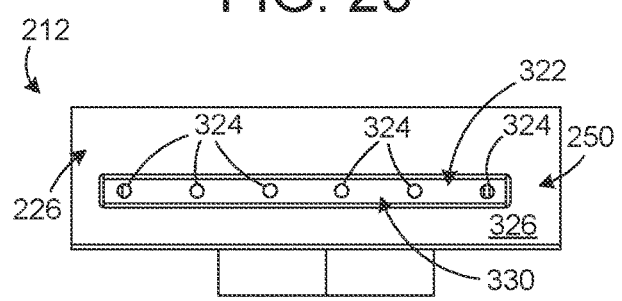
FIG. 25 is a top view of the anchor of the mounting system illustrated in FIG. 18.
Figure 26:
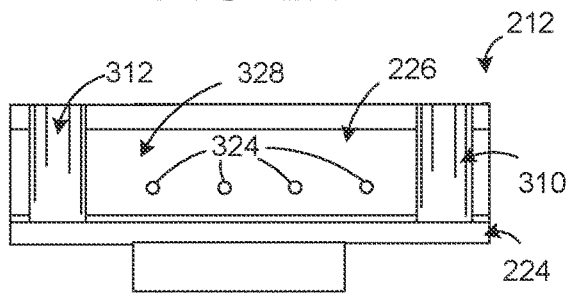
FIG. 26 is a bottom view of the anchor of the mounting system illustrated in FIG. 18.
Figure 27:
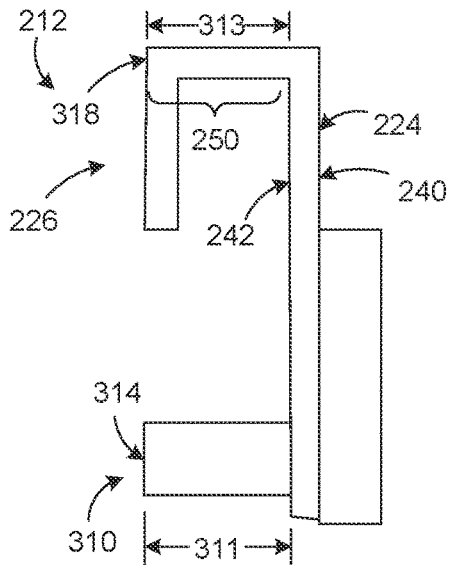
FIG. 27 is a side view of the anchor of the mounting system illustrated in FIG. 18.
Figure 28:
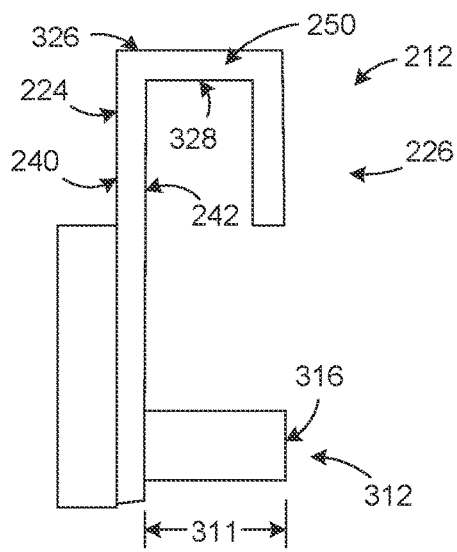
FIG. 28 is another side view of the anchor of the mounting system illustrated in FIG. 18.
Figure 29:
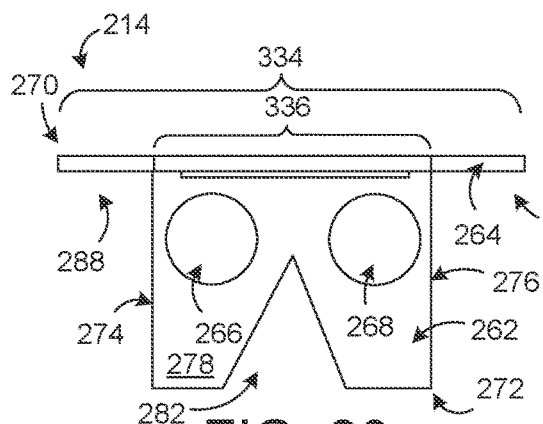
FIG. 29 is a front view of the support of the mounting system illustrated in FIG. 18.
Figure 30:
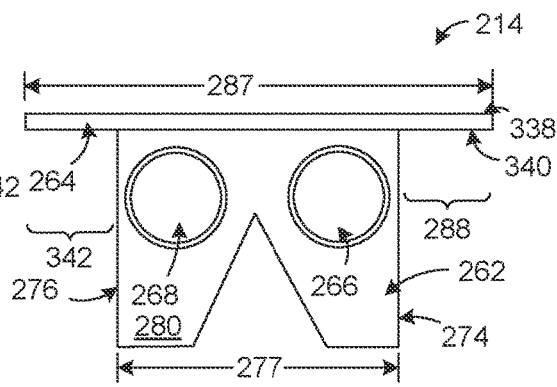
FIG. 30 is a rear view of the support of the mounting system illustrated in FIG. 18.
Figure 31:
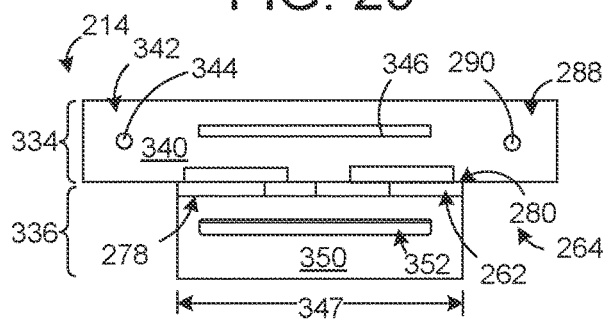
FIG. 31 is a bottom view of the support of the mounting system illustrated in FIG. 18.
Figure 32:
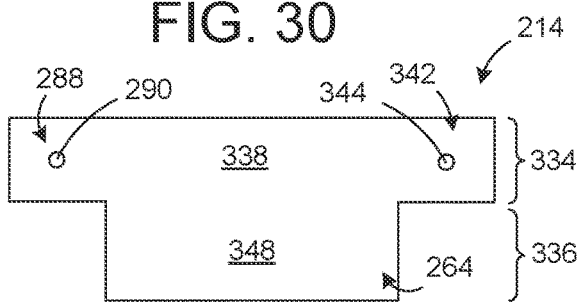
FIG. 32 is a top view of the support of the mounting system illustrated in FIG. 18.
Figure 33:
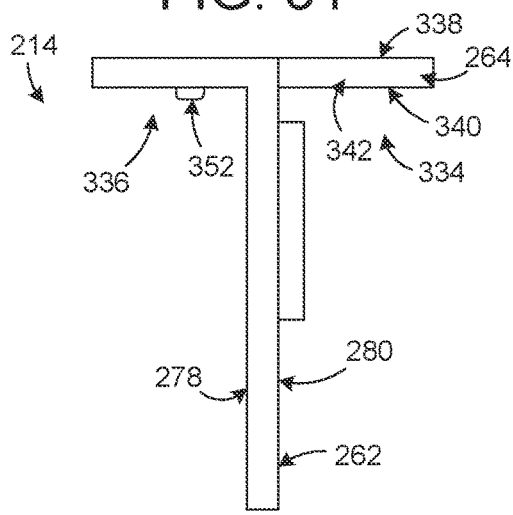
FIG. 33 is a side view of the support of the mounting system illustrated in FIG. 18.
Figure 34:
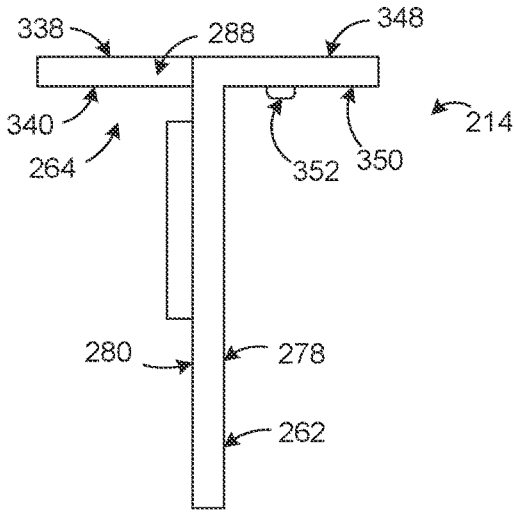
FIG. 34 is another side view of the support of the mounting system illustrated in FIG. 18.
Figure 35:
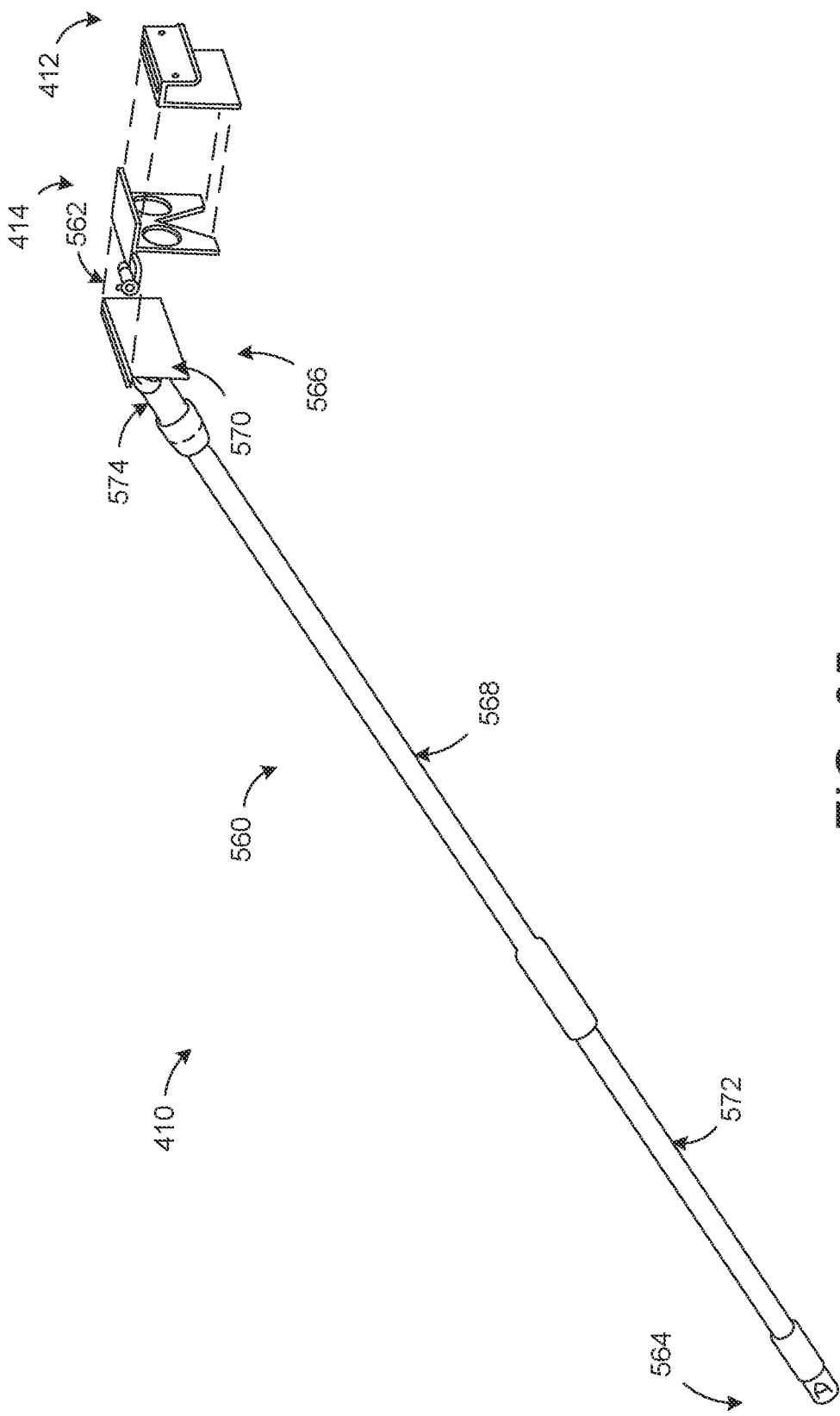
FIG. 35 is an exploded view of a third example mounting system. The mounting system includes an anchor, a support, and delivery device.
Figure 36:
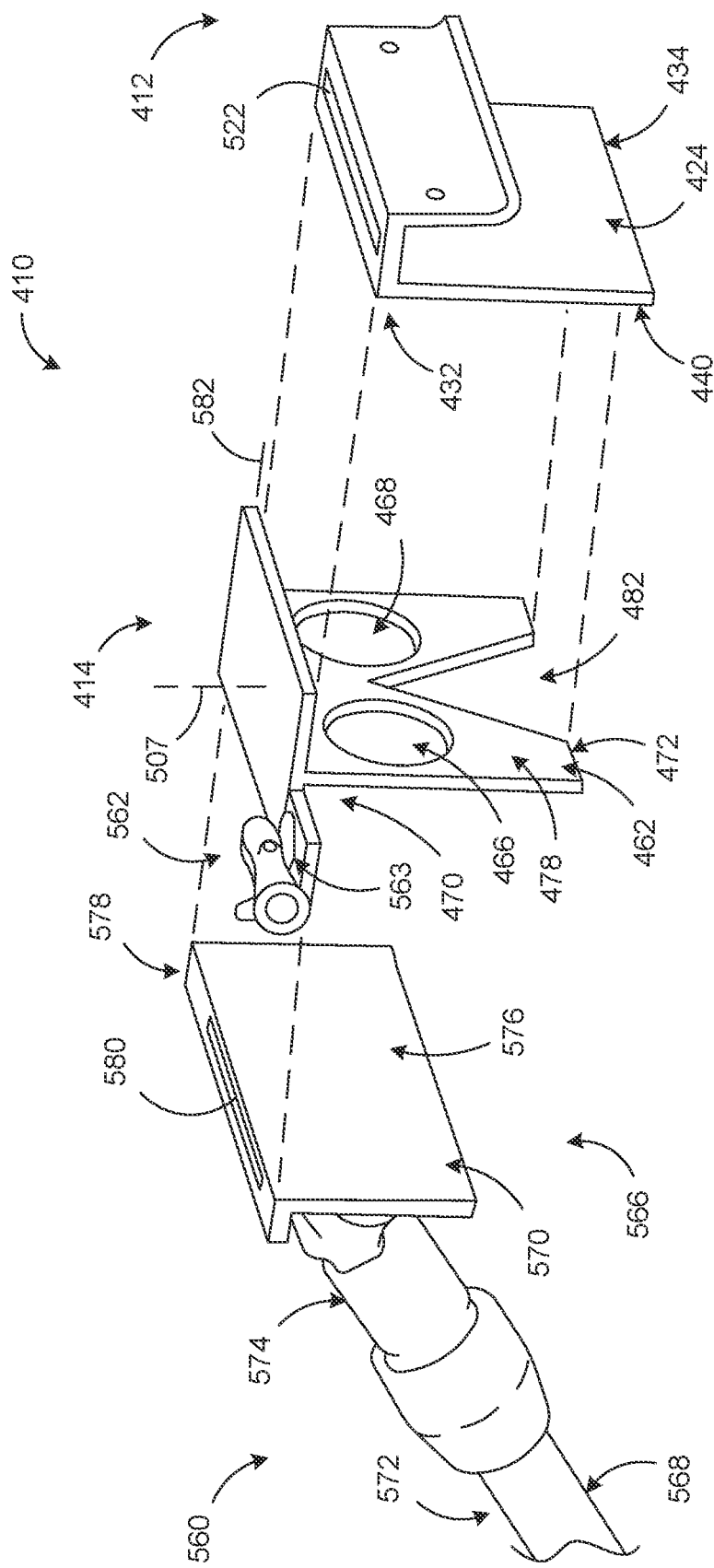
FIG. 36 is a partial perspective view of the mounting system illustrated in FIG. 35.
Figure 37:
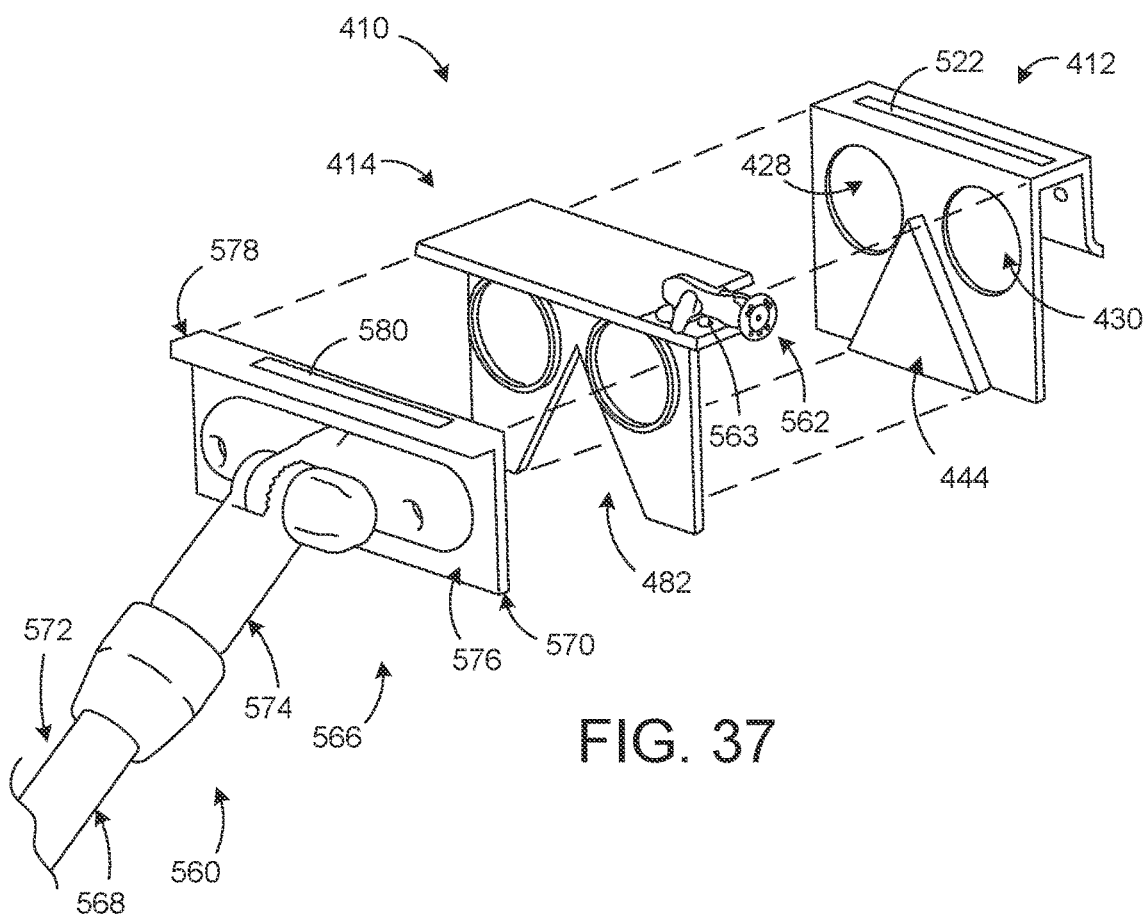
FIG. 37 is another partial perspective view of the mounting system illustrated in FIG. 35.
Figure 38:
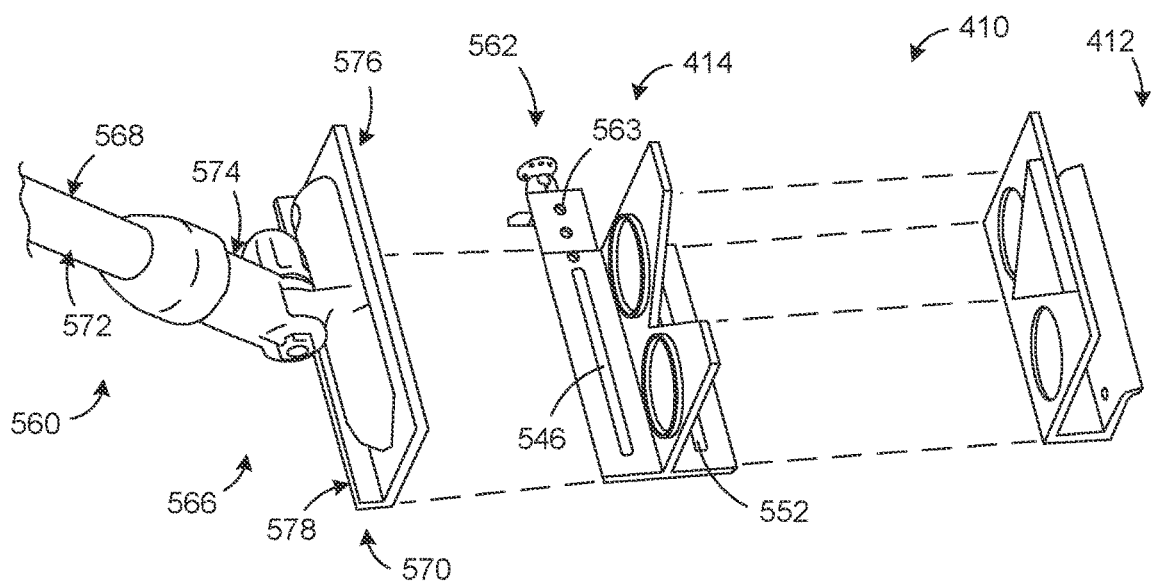
FIG. 38 is another partial perspective view of the mounting system illustrated in FIG. 35.

The support 214 is releasably attachable to the anchor 212. FIGS. 18, 21, and 22 show the anchor 212 and support 214 separated from one another and FIGS. 19 and 20 show the support 214 releasably attached to the anchor 212. The mounting system 210 can be used to mount a secondary device, such as a sensor, to an elevated support structure, such as a gutter, and/or to provide access to a secondary device on an elevated support structure, as described herein.

In the illustrated embodiment, the anchor 212 has an anchor main body 224, an anchor arm 226, a first magnet 228, a second magnet 230, a first attachment support 310, a second attachment support 312, a first attachment passageway 314, and a second attachment passageway 316. Each of the first and second attachment supports 310, 312 extend from the second surface 242 of the anchor main body 224 and away from the first surface 240 of the anchor main body 224 a distance 311 that is equal to a distance 313 that extends from the second surface 242 to an end 318 of the first portion 250 of the anchor arm 226. This structural arrangement provides additional support for the anchor 212 when it is attached to an elevated support structure using the first and second attachment supports 310, 312. The first attachment passageway 314 extends through the anchor main body 224 and the first attachment support 310 and the second attachment passageway 316 extends through the anchor main body 224 and the second attachment support 312. In the embodiment shown, the first attachment passageway 314 extends from the first surface 240 and through the entire first attachment support 310 and the second attachment passageway 316 extends from the first surface 240 and through the entire second attachment support 312. Each of the first and second attachment passageways 314, 316 is sized to receive a fastener (e.g., threaded fastener) to accomplish attachment between the anchor 212 and an elevated support structure (e.g., part of exterior wall of home).

The first portion 250 of the anchor arm 226 defines a recess 322 and a plurality of passageways 324. The recess 322 extends from a top surface 326 of the first portion 250 toward a bottom surface 328 of the first portion 250 to a recess base 330. Each passageway of the plurality of passageways 324 extends from the recess base 330 to the bottom surface 328 of the first portion 250. The inclusion of a plurality of passageways 324 provides a mechanism for allowing drainage of any fluid (e.g., rain water) that becomes disposed within the recess 322 during use.

The support 214 has a support main body 262, a support arm 264, a first magnet 266, and a second magnet 268. In the embodiment illustrated, and as shown in FIGS. 29 through 34, the support arm 264 has a first portion 334 and a second portion 336. The first portion 334 of the support arm 264 extends from the second surface 280 of the support main body 262 and away from the first surface 278 of the support main body 262. The first portion 334 of the support arm 264 has a width 287, a top surface 338, a bottom surface 340, and defines a first wing 288, a second wing 342, a first passageway 290, a second passageway 344, and a recess 346. The width 287 of the first portion 334 of the support arm 264 is greater than the width 277 of the support main body 262 such that the support arm 264 defines the first and second wings 288, 342. The first wing 288 extends from the support arm 264 and away from the second side 276 of the support main body 262. The second wing 342 extends from the support arm 264 and away from the first side 274 of the support main body 262. The first passageway 290 extends through the thickness of the first wing 288 and the second passageway 344 extends through the thickness of the second wing 342. Each of the first and second passageways 290, 344 is sized to receive a fastener to releasably attach a secondary device, such as a sensor, to the support 214. The recess 346 extends from bottom surface 340 toward the top surface 338 and is sized to receive a projection of a delivery device, as described herein.

The second portion 336 of the support arm 264 extends from the first surface 278 of the support main body 262 and away from the second surface 280 of the support main body 262. The second portion 336 of the support arm 264 has a width 347, a top surface 348, a bottom surface 350, and defines a projection 352. The width 347 of the second portion 336 of the support arm 264 is equal to the width 277 of the support main body 262. However, alternative embodiments can include a first and/or second portion of a support arm that has a width equal to, greater than, less than, or about the width of a support main body. The projection 352 extends from bottom surface 350 and away from the top surface 348 and is sized to be received by the recess 322 of the first portion 250 of the anchor arm 226. In the embodiment shown, the projection 352 and recess 322 mate to provide additional structural support between the anchor 212 and support 214 when the support 214 is releasably attached to the anchor 212.

A method of attaching an anchor to an elevated support structure will now be described. To accomplish releasable attachment between an anchor and an elevated support structure, such as an exterior surface of a building, a force is applied to the anchor 212 in any suitable direction until each of the first and second attachment supports 310, 312 is disposed adjacent to an exterior surface of a building, or other structure. Subsequently, a first fastener is passed through the first attachment passageway 314 and into the building, or other structure, and a second fastener is passed through the second attachment passageway 316 and into the building, or other structure to releasably attach the anchor to the building, or other structure.

A method of attaching a support to an anchor will now be described. To accomplish releasable attachment between an anchor 212 and a support 214, the support 214 is positioned such that the first surface 278 of the support main body 262 is directed toward the first surface 240 of the anchor main body 224. In addition, the support 214 is rotated such that the second end 272 of the support main body 262 is oriented in the same direction as the second end 234 of the anchor main body 224. An axial force is then applied to the support 214 directed toward the first end 270 of the support main body 262 such that the first end 270 of the support 214 is elevated relative to the first end 232 of the anchor 212. An axial force directed toward the anchor 212 is then applied to the support 214 until the first surface 278 of the support main body 262 contacts the first surface 240 of the anchor main body 224. An axial force is then applied to the support 214 directed toward the second end 272 of the support main body 262 until the projection 244 is disposed within the notch 282, the first magnet 228 of the anchor 212 is magnetically attracted to the second magnet 268 of the support 214, the second magnet 230 of the anchor 212 is magnetically attracted to the first magnet 266 of the support 214, and the projection 352 of the support 214 is disposed within the recess 322 of the anchor 212. As shown in FIGS. 19 and 20, when the support 214 is releasably attached to the anchor 212 the projection 244 is disposed within the notch 282, the projection 244 contacts the support 214, the first surface 240 of the anchor main body 224 contacts the first surface 278 of the support main body 262, and the projection 352 contacts the anchor 212.

As shown in FIG. 19, when the support 214 is releasably attached to the anchor 212, the projection 244 prevents axial movement of the support 214 in a first direction, shown by arrow 304, and allows axial movement of the support 214 in a second direction, shown by arrow 306. The second direction 306 is opposite the first direction 304. The first direction 304 and the second direction 306 are disposed parallel to an axis 307 that extends through the first end 270 and the second end 272 of the support main body 262. When the support 214 is releasably attached to the anchor 212, the projection 352 prevents axial movement of the support 214 along a hypothetical plane 354 that is disposed orthogonally to the axis 307.

A method of providing access to a secondary device (e.g., sensor attached to support 214 (e.g., support arm 264, wing 288, wing 342)) on an elevated support structure will now be described. To accomplish access to a secondary device attached to a support 214, which is releasably attached to an anchor 212, an axial force is applied to the support 214 directed away from the second end 272 of the support main body 262 until the projection 244 becomes free of the notch 282. An axial force directed away from the anchor 212 is then applied to the support 214 until the first surface 278 of the support main body 262 is free of contact with the first surface 240 of the anchor main body 224. An axial force is then applied to the support 214 directed away from the first end 270 of the support main body 262 until support 214 and the secondary device become accessible to a user.

FIGS. 35 through 38 illustrate a third example mounting system 410 that includes an anchor 412, a support 414, a delivery device 560, and a sensor 562. The mounting system 410 is similar to the mounting system 210 illustrated in FIGS. 18 through 34 and described above, except as detailed below. The support 414 is releasably attachable to the anchor 412 and the support 414 is releasably attachable to the delivery device 560. The mounting system 410 can be used to mount a secondary device, such as a sensor, to an elevated support structure, such as a gutter, and/or to provide access to a secondary device on an elevated support structure, as described herein.

In the illustrated embodiment, the anchor 412 omits the inclusion of a first attachment support, a second attachment support, a first attachment passageway, and a second attachment passageway and the support 414 omits the inclusion of a second wing.

The delivery device 560 has a first end 564, a second end 566, a handle 568, and a delivery plate 570. The handle 568 has a first portion 572 and a second portion 574 that are telescopic such that the length of the handle 568 can be adjusted according to the location it is desired to position the mounting system 410 and/or access the support 414 or the sensor 562 attached to the support 414. The delivery plate 570 has a main body 576 and an attachment arm 578 that extends from the main body 576. The attachment arm 578 defines a projection 580 that extends from the attachment arm 578 and away from the main body 576. The projection 580 is sized to be received by the recess 546 defined by the support 414. The sensor 562 is releasably attached to the support 414 using a fastener 563 and comprises a rain sensor for a sprinkler system, such as those known in the art.

While the delivery device 560 has been illustrated as having particular structural arrangement, a delivery device can have any suitable structural arrangement and be formed of any suitable material. Selection of a suitable structural arrangement for a delivery device and of a material to form a delivery device can be based on various considerations, such as the type of elevated support structure to which a mounting system is intended to be attached. Examples of materials considered suitable to form a delivery device include metals, plastics, polymers, and any other material considered suitable for a particular embodiment.

A method of attaching the support 414 to the anchor 412 will now be described. Once the anchor 412 is releasably attached to an elevated support structure, releasable attachment between the anchor 412 and the support 414 can be accomplished by releasably attaching the delivery device 560 to the support 414 by positioning the projection 580 within the recess 546 defined by the support 414. Subsequently, the support 414 is positioned such that the first surface 478 of the support main body 462 is directed toward the first surface 440 of the anchor main body 424. In addition, the support 414 is rotated such that the second end 472 of the support main body 462 is oriented in the same direction as the second end 434 of the anchor main body 424. An axial force is then applied to the support 414 via the handle 568 of the delivery device 560 directed toward the first end 470 of the support main body 462 such that the first end 470 of the support 414 is elevated relative to the first end 432 of the anchor 412. An axial force directed toward the anchor 412 is then applied to the support 414 via the handle 568 of the delivery device 560 until the first surface 478 of the support main body 462 contacts the first surface 440 of the anchor main body 424. An axial force is then applied to the support 414 directed toward the second end 472 of the support main body 462 via the handle 568 of the delivery device 560 until the projection 444 is disposed within the notch 482, the first magnet 428 of the anchor 412 is magnetically attracted to the second magnet 468 of the support 414, the second magnet 430 of the anchor 412 is magnetically attracted to the first magnet 466 of the support 414, and the projection 552 of the support 414 is disposed within the recess 522 of the anchor 412. When the support 414 is releasably attached to the delivery device 560, the projection 580 prevents axial movement of the support 414 along a hypothetical plane 582 that is disposed orthogonally to the axis 507 of the support 414.

A method of providing access to the sensor 562 when the support 414 is disposed on an elevated support structure and releasably attached to an anchor 412 will now be described. An axial force is applied to the handle 568 of the delivery device 560 directed toward the support 414. Subsequently, a force is applied to the handle 568 until the projection 580 of the delivery plate 570 is disposed within the recess 546 of the support 414. A force is then applied to the support 414 via the handle 568 directed away from the second end 472 of the support main body 462 until the projection 444 becomes free of the notch 482. An axial force directed away from the anchor 212 is then applied to the support 214 via the handle 568 until the first surface 478 of the support main body 462 is free of contact with the first surface 440 of the anchor main body 424. An axial force is then applied to the support 414 directed away from the first end 470 of the support main body 462 via the handle 468 until support 414 and the sensor 562 become accessible to a user.

Figure 39:
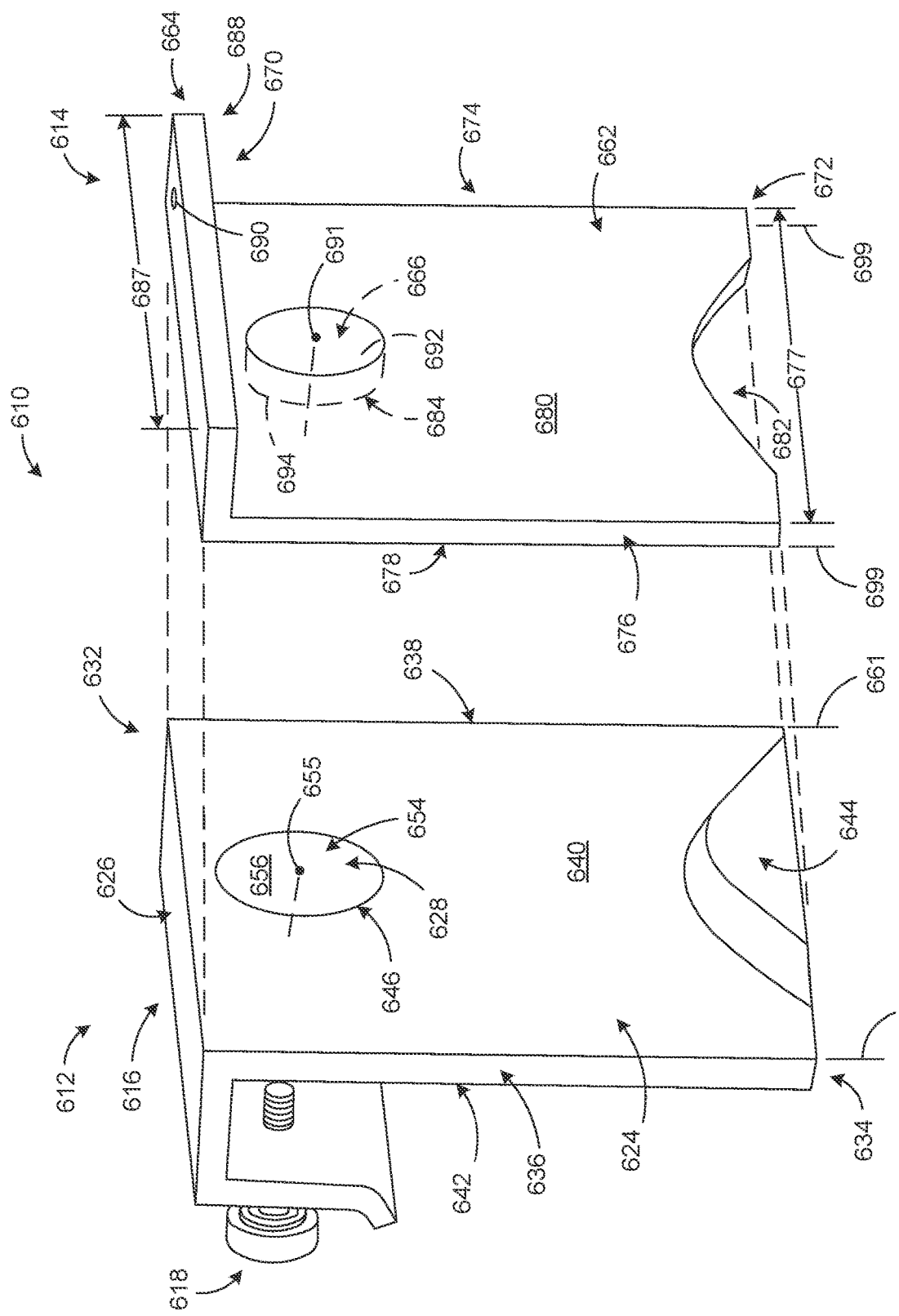
FIG. 39 is an exploded view of a fourth example mounting system. The mounting system includes an anchor and a support.

FIG. 39 illustrates a fourth example mounting system 610 that includes an anchor 612, a support 614, a first fastener 616, and a second fastener 618. The mounting system 610 is similar to the mounting system 10 illustrated in FIGS. 1 through 17 and described above, except as detailed below. The support 614 is releasably attachable to the anchor 612. The mounting system 610 can be used to mount a secondary device, such as a sensor, to an elevated support structure, such as a gutter, and/or to provide access to a secondary device on an elevated support structure, as described herein.

In the illustrated embodiment, the anchor 612 has an anchor main body 624, an anchor arm 626, and a first magnet 628. The anchor main body 624 has a first end 632, a second end 634, a first side 636, a second side 638, a first surface 640, a second surface 642, and defines a projection 644, and a first recess 646. The projection 644 extends from the first surface 640 of the anchor main body 624 and away from the second surface 642 of the anchor main body 624, extends from the second end 634 of the anchor main body 624 toward the first end 632 of the anchor main body 624, and is parabolic. The first recess 646 extends from the first surface 640 of the anchor main body 624 toward the second surface 642 of the anchor main body 624.

The first magnet 628 of the anchor 612 is disposed between the projection 644 and the first end 632 of the anchor main body 624. The first magnet 628 has a main body 654 that has a first central magnet axis 655 and a first magnet surface 656. The first magnet surface 656 has a first polarity. The first magnet 628 is disposed within the first recess 646. The first central magnet axis 655 extends through the main body 654 of the first magnet 628 of the anchor 612. The first central magnet axis 655 is disposed orthogonal to a hypothetical plane 661 that contains a portion, or the entirety, of the first surface 640 of the anchor main body 624.

The support 614 has a support main body 662, a support arm 664, and a first magnet 666. The support main body 662 has a first end 670, a second end 672, a first side 674, a second side 676, a width 677, a first surface 678, a second surface 680, and defines a notch 682 and a first recess 684. In the illustrated embodiment, the notch 682 extends from the first surface 678 of the support main body 662 to the second surface 680 of the support main body 662, extends from the second end 672 of the support main body 662 toward the first end 670 of the support main body 662, and is parabolic. In the embodiment shown, the notch 682 is sized and configured to mate with the projection 644 of the anchor 612. The first recess 684 extends from the first surface 678 of the support main body 662 toward the second surface 680 of the support main body 662.

The support arm 664 extends from the second surface 680 of the support main body 662 and away from the first surface 678 of the support main body 662. The support arm 664 has a width 687 and defines a wing 688 and a passageway 690. The width 687 of the support arm 664 is greater than the width 677 of the support main body 662 such that the support arm 664 defines the wing 688. The wing 688 extends from the support arm 664 and away from the second side 676 of the support main body 662. The passageway 690 extends through the thickness of the wing 688 and is sized to receive a fastener to releasably attach a secondary device, such as a sensor, to the support 614.

The first magnet 666 of the support 614 is disposed between the notch 682 and first end 670 of the support main body 662. The first magnet 666 has a main body 692 that has a first central magnet axis 691 and a first magnet surface 694. The first magnet surface 694 has a second polarity that is different than the first polarity of the first magnet surface 656 of the first magnet 628 of the anchor 612 such that the first magnet 694 of the support 614 is magnetically attracted to the first magnet 628 of the anchor 612. The first magnet 666 is disposed within the first recess 684. The first magnet axis 691 extends through the main body 692 of the first magnet 666 of the support 614. The first magnet axis 691 is disposed orthogonal to a hypothetical plane 699 that contains a portion, or the entirety, of the first surface 678 of the support main body 662. The first magnet axis 655 of the first magnet 628 of the anchor 612 is coaxial with the first magnet axis 691 of the first magnet 666 of the support 614 when the support 614 is releasably attached to the anchor 612.

FIGS. 40 and 41 illustrate a fifth example mounting system that includes an anchor 812, a support 814, a first fastener 816, and a second fastener 818. The mounting system 810 is similar to the mounting system 10 illustrated in FIGS. 1 through 17 and described above, except as detailed below. The support 814 is releasably attachable to the anchor 812. The mounting system 810 can be used to mount a secondary device, such as a sensor, to an elevated support structure, such as a gutter, and/or to provide access to a secondary device on an elevated support structure, as described herein.

In the illustrated embodiment, and as shown in FIG. 40, the anchor 812 has an anchor main body 824, an anchor arm 826, and a first magnet 828. The anchor main body 824 has a first end 832, a second end 834, a first side 836, a second side 838, a first surface 840, a second surface 842, and defines a projection 844. The projection 844 extends from the first surface 840 of the anchor main body 824 and away from the second surface 842 of the anchor main body 824, extends from a location 835 between the second end 834 and the first end 832 of the anchor main body 824 toward the first end 832 of the anchor main body 824, and is triangular. The first magnet 828 of the anchor 812 is disposed between the projection 844 and the first end 832 of the anchor main body 824. The first magnet 828 has a main body 854 that has a first central magnet axis 855 and a first magnet surface 856. The first magnet surface 856 has a first polarity. The first magnet 828 is disposed on the first surface 840 of the anchor main body 824. The first magnet axis 855 extends through the main body 854 of the first magnet 828 of the anchor 812. The first magnet axis 855 is disposed orthogonal to a hypothetical plane 861 that contains a portion, or the entirety, of the first surface 840 of the anchor main body 824.

The support 814 has a support main body 862 and a first magnet 866. The support main body 862 has a first end 870, a second end 872, a first side 874, a second side 876, a first surface 878, a second surface 880, and defines a notch 882 and a passageway 884. In the illustrated embodiment, the notch 882 extends from the first surface 878 of the support main body 862 toward the second surface 880 of the support main body 862 but not entirely through the support main body 862, extends from a location 871 between the second end 872 of the support main body 862 toward the first end 870 of the support main body 862, and is triangular. In the embodiment shown, the notch 882 is sized and configured to mate with the projection 844 of the anchor 812. The passageway 884 extends from the first surface 878 of the support main body 862 to the second surface 880 of the support main body 862 and is sized to receive a fastener to accomplish attachment between the support 814 and a secondary device, such as a sensor. The first magnet 866 of the support 814 is disposed between the notch 882 and first end 870 of the support main body 862. The first magnet 866 has a main body 892 that has a first central magnet axis 891 and a first magnet surface 894. The first magnet surface 894 has a second polarity that is different than the first polarity of the first magnet surface 856 of the first magnet 828 of the anchor 812 such that the first magnet 894 of the support 814 is magnetically attracted to the first magnet 828 of the anchor 812. The first magnet 866 is disposed on the first surface 878 of the support main body 862. The first central magnet axis 891 extends through the main body 892 of the first magnet 866 of the support 814. The first central magnet axis 891 is disposed orthogonal to a hypothetical plane 899 that contains a portion, or the entirety, of the first surface 878 of the support main body 862.

Figure 42:
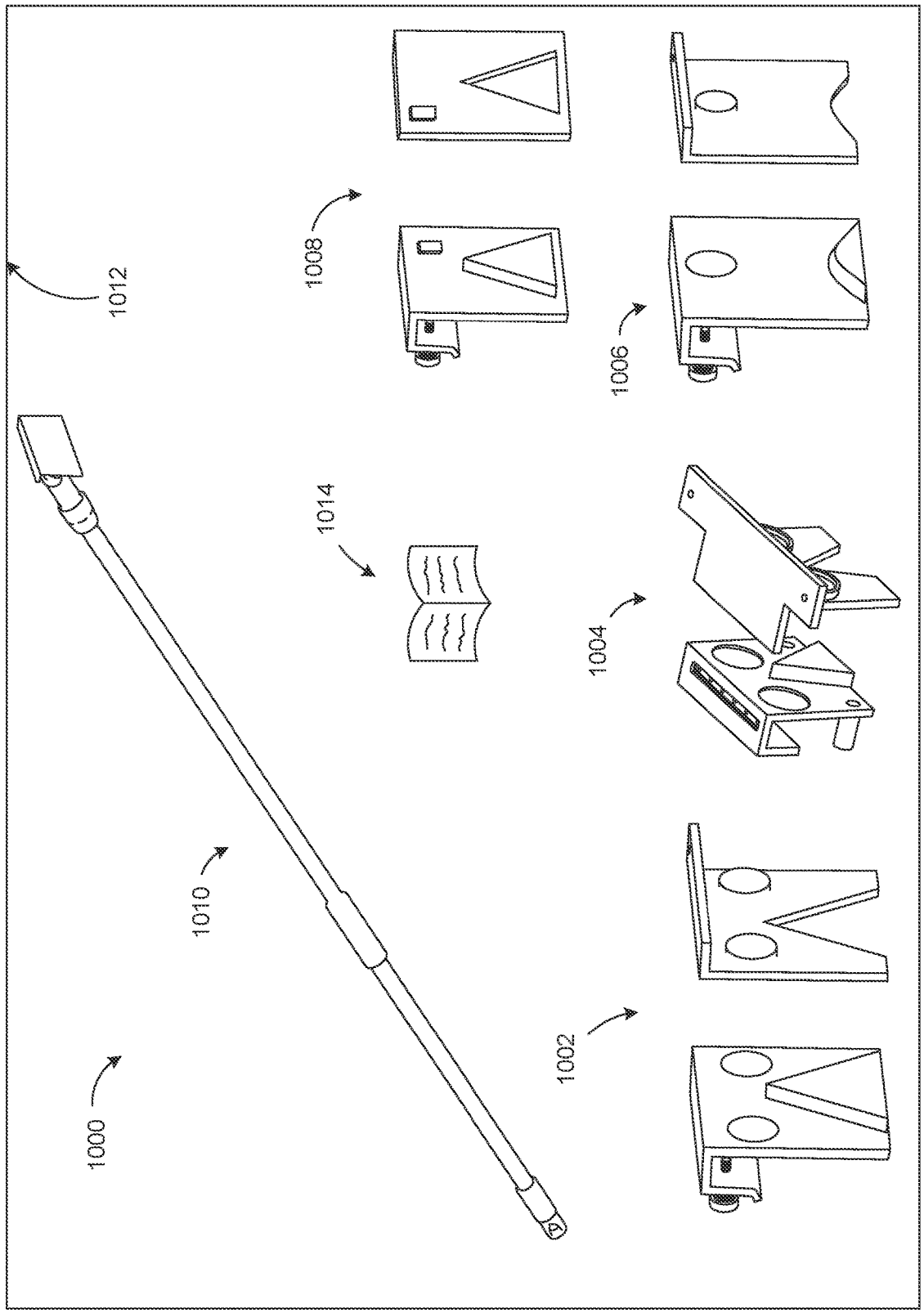
FIG. 42 illustrates an example kit that includes a plurality of mounting systems, a delivery device, a container, and instructions for use.

FIG. 42 illustrates an exemplary kit 1000 that includes a mounting system for mounting a secondary device to an elevated support structure. The kit 1000 comprises a first mounting system 1002 according to an embodiment, such as mounting system 10 illustrated in FIG. 1; a second mounting system 1004 according to an embodiment, such as mounting system 210 illustrated in FIG. 18; a third mounting system 1006 according to an embodiment, such as mounting system 610 illustrated in FIG. 39; a fourth mounting system 1008 according to an embodiment, such as mounting system 810 illustrated in FIGS. 40 and 41; a delivery device 1010 for accessing a support releasably attached to an anchor according to an embodiment, such as delivery device 560 illustrated in FIG. 35; a storage container 1012; and instructions for use 1014.

The storage container 1012 provides storage for the systems 1002, 1004, 1006, 1008, delivery device 1010, and instructions for use 1014 when not in use. Each system 1002, 1004, 1006, 1008, and delivery device 1010 included in the kit 1000 is sized and configured such that it can be housed within the storage container 1012 when disassembled and not in use. While not illustrated, a kit can optionally include one or more fasteners or other accessories to accomplish attachment of a mounting system, or portion of a mounting system (e.g., anchor, support) to an elevated support structure and/or to accomplish attachment of a secondary device to a support. Also, while not illustrated, a kit can optionally include one or more secondary devices.

While the kit 1000 has been illustrated as including four mounting systems 1002, 1004, 1006, 1008, and a delivery device 1010, any suitable number, and type, of mounting systems and/or delivery devices can be included in a kit. Selection of a suitable number of mounting systems and/or delivery devices to include in a kit according to a particular embodiment can be based on various considerations, such as the type of secondary device intended to be attached to a support. Examples of numbers of mounting systems and/or delivery devices considered suitable to include in a kit include at least one, one, two, a plurality, three, four, five, six, seven, eight, nine, ten, more than ten, and any other number considered suitable for a particular embodiment.

Furthermore, while mounting system 10, mounting system 210, mounting system 610, mounting system 810, and delivery device 560 have been illustrated as included in kit 1000, any suitable mounting system and/or delivery device can be included in a kit. Selection of a suitable mounting system and/or delivery device to include in a kit according to a particular embodiment can be based on various considerations, such as the desired placement of a mounting system on an elevated support structure. Examples of mounting systems and delivery devices considered suitable to include in a kit include mounting system 10, mounting system 210, mounting system 410, mounting system 610, mounting system 810, delivery device 560, and/or any other mounting system and/or delivery device considered suitable for a particular embodiment.

The mounting devices described herein are considered advantageous at least because they provide structure for mounting an anchor to an elevated support structure and they provide supports that are easily accessible from a safe location (e.g., the ground). For example, using the delivery devices, supports, and anchors described herein, a user can easily access a support to change the batteries in a previously-installed secondary device, switch out a previously-installed secondary device with a new secondary device, and/or install a secondary device. These operations can generally be accomplished without use of a ladder.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular arrangement of elements and steps disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A mounting system comprising:
    an anchor having an anchor main body and a first magnet, the anchor main body having a first end, a second end, a first surface, a second surface, and defining a projection, the first surface of the anchor main body opposably facing the second surface of the anchor main body, the projection extending from the first surface of the anchor main body and away from the second surface of the anchor main body, the first magnet of the anchor disposed between the projection and the first end of the anchor main body; and
    a support releasably attachable to the anchor, the support having a support main body, a support arm, and a first magnet, the support main body having a first end, a second end, a first surface, a second surface, and defining a notch, the first surface of the support main body opposably facing the second surface of the support main body, the notch extending from the first surface of the support main body toward the second surface of the support main body, the support arm extending from the first surface of the support main body and away from the second surface of the support main body, the support arm having a top surface, a bottom surface, and defining a projection extending from the bottom surface and away from the top surface, the first magnet of the support disposed between the notch and first end of the support main body;
    wherein the projection of the anchor is disposed within the notch of the support when the support is releasably attached to the anchor.

2. The mounting system of claim 1, wherein the projection of the anchor prevents axial movement of the support in a first direction and allows axial movement of the support in a second direction when the support is releasably attached to the anchor, the second direction opposite the first direction.

3. The mounting system of claim 1, wherein the projection of the anchor contacts the support when the support is releasably attached to the anchor.

4. The mounting system of claim 1, wherein the first surface of the anchor main body contacts the first surface of the support main body when the support is releasably attached to the anchor.

5. The mounting system of claim 1, wherein the first magnet of the anchor is disposed on the first surface of the anchor main body between the projection of the anchor and first end of the anchor main body.

6. The mounting system of claim 1, wherein the notch extends from the first surface of the support main body to the second surface of the support main body.

7. The mounting system of claim 1, wherein the notch extends from the second end of the support main body toward the first end of the support main body.

8. The mounting system of claim 1, wherein the projection of the anchor extends from the second end of the anchor main body toward the first end of the anchor main body.

9. The mounting system of claim 1, wherein the anchor includes an anchor arm having a first portion and a second portion, the first portion extending from the second surface of the anchor main body and away from the first surface of the anchor main body, the second portion extending from the first portion.

10. The mounting system of claim 9, wherein the first portion of the anchor arm defines a recess; and
wherein the projection defined by the support arm is disposed within the recess defined by the anchor arm when the support is releasably attached to the anchor.

11. The mounting system of claim 10, wherein the first portion of the anchor arm defines a plurality of passageways within the recess.

12. The mounting system of claim 1, wherein the anchor includes an anchor arm defining a passageway, the anchor arm extending from the second surface of the anchor and away from the first surface of the anchor, the passageway extending through the anchor arm.

13. The mounting system of claim 1, wherein the anchor has a second magnet disposed between the projection and the first end of the anchor main body.

14. The mounting system of claim 1, wherein the support has a second magnet disposed between the notch and the first end of the support main body.

15. The mounting system of claim 1, wherein the support arm defines a wing.

16. The mounting system of claim 1, wherein the projection of the anchor is triangular; and
wherein the notch is triangular.

17. The mounting system of claim 1, further comprising a first fastener and a second fastener releasably attached to the anchor.

18. The mounting system of claim 1, wherein the first surface of the anchor main body extends from the first end of the anchor main body to the second end of the anchor main body.

19. A mounting system comprising:
an anchor having an anchor main body and a first magnet, the anchor main body having a first end, a second end, a first surface, a second surface, and defining a projection, the first surface of the anchor main body opposably facing the second surface of the anchor main body, the projection extending from the first surface of the anchor main body and away from the second surface of the anchor main body, the projection extending from the second end of the anchor main body toward the first end of the anchor main body, the first magnet of the anchor disposed between the projection and the first end of the anchor main body; and
a support releasably attachable to the anchor, the support having a support main body, a support arm, and a first magnet, the support main body having a first end, a second end, a first surface, a second surface, and defining a notch, the first surface of the support main body opposably facing the second surface of the support main body, the notch extending from the first surface of the support main body to the second surface of the support main body, the notch extending from the second end of the support main body toward the first end of the support main body, the support arm extending from the first surface of the support main body and away from the second surface of the support main body, the support arm having a top surface, a bottom surface, and defining a projection extending from the bottom surface and away from the top surface, the first magnet of the support disposed between the notch and first end of the support main body;
wherein the projection of the anchor is disposed within the notch of the support when the support is releasably attached to the anchor.

20. A mounting system comprising:
an anchor having an anchor main body, a first magnet, and a second magnet, the anchor main body having a first end, a second end, a first surface, a second surface, and defining a projection, the first surface of the anchor main body opposably facing the second surface of the anchor main body, the projection extending from the first surface of the anchor main body and away from the second surface of the anchor main body, the projection extending from the second end of the anchor main body toward the first end of the anchor main body, the first magnet of the anchor disposed between the projection and the first end of the anchor main body, the second magnet of the anchor disposed between the projection and the first end of the anchor main body; and
a support releasably attachable to the anchor, the support having a support main body, a support arm, a first magnet, and a second magnet, the support main body having a first end, a second end, a first surface, a second surface, and defining a notch, the first surface of the support main body opposably facing the second surface of the support main body, the notch extending from the first surface of the support main body to the second surface of the support main body, the notch extending from the second end of the support main body toward the first end of the support main body, the support arm extending from the first surface of the support main body and away from the second surface of the support main body, the support arm having a top surface, a bottom surface, and defining a projection extending from the bottom surface and away from the top surface, the first magnet of the support disposed between the notch and first end of the support main body, the second magnet of the support disposed between the notch and first end of the support main body;
wherein the projection of the anchor is disposed within the notch of the support when the support is releasably attached to the anchor.

* * * * *